(12) United States Patent
Wakabayashi et al.

(10) Patent No.: US 8,040,383 B2
(45) Date of Patent: Oct. 18, 2011

(54) COMMUNICATION SYSTEM, COMMUNICATION METHOD, COMPUTER-READABLE MEDIUM AND IMAGE SHOOTING DEVICE

(75) Inventors: Satoru Wakabayashi, Miyagi (JP); Kenji Yoshida, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 512 days.

(21) Appl. No.: 12/219,680

(22) Filed: Jul. 25, 2008

(65) Prior Publication Data

US 2009/0086031 A1 Apr. 2, 2009

(30) Foreign Application Priority Data

Sep. 28, 2007 (JP) ................................. 2007-256592

(51) Int. Cl.
*H04N 5/232* (2006.01)
(52) U.S. Cl. .............. 348/211.2; 348/211.99; 348/211.1
(58) Field of Classification Search ............ 348/211.99–211.14; 455/73–90.3
See application file for complete search history.

(56) References Cited

U.S. PATENT DOCUMENTS

| | | | | |
|---|---|---|---|---|
| 7,430,001 | B2 * | 9/2008 | Fujii | 348/211.2 |
| 7,576,779 | B2 * | 8/2009 | Tanaka et al. | 348/211.4 |
| 7,602,420 | B2 * | 10/2009 | Watanae | 348/211.2 |
| 7,619,657 | B2 * | 11/2009 | Watanabe et al. | 348/211.2 |
| 7,714,911 | B2 * | 5/2010 | Yoshida | 348/231.5 |
| 7,777,779 | B2 * | 8/2010 | Yasuda | 348/207.2 |
| 7,936,370 | B2 * | 5/2011 | Renkis | 348/143 |
| 2003/0071899 | A1 * | 4/2003 | Joao | 348/148 |
| 2003/0090573 | A1 * | 5/2003 | Tojo | 348/207.2 |
| 2003/0193576 | A1 * | 10/2003 | Fujii | 348/211.8 |
| 2005/0104973 | A1 * | 5/2005 | Iizuka | 348/211.1 |
| 2008/0092200 | A1 * | 4/2008 | Grady et al. | 725/133 |

FOREIGN PATENT DOCUMENTS

| | | |
|---|---|---|
| JP | 11-177497 (A) | 7/1999 |
| JP | 2004-228804 | 8/2004 |
| JP | 2004-294310 (A) | 10/2004 |
| JP | 2006-186418 (A) | 7/2006 |
| JP | 2007-027843 (A) | 2/2007 |
| JP | 2007-142653 | 6/2007 |
| JP | 2007-158471 (A) | 6/2007 |
| WO | WO 2007-099639 A1 | 9/2007 |

OTHER PUBLICATIONS

Notice of Reasons for Rejection dated Jun. 14, 2011 (with English translation).

* cited by examiner

*Primary Examiner* — Jason Chan
*Assistant Examiner* — Pritham Prabhakher
(74) *Attorney, Agent, or Firm* — McGinn IP Law Group, PLLC

(57) ABSTRACT

A communication system includes a first and a second communication devices, and the first and the second communication devices includes a first and a second transmission units that are disposed respectively on bodies of the communication devices and wirelessly transmits predetermined information to each other. The first communication device further includes a first reception unit that is disposed in a position where the first reception unit is capable of communicating with the second transmission unit and receives second information that has been transmitted from the second transmission unit, and a first control unit that controls the first communication device such that, when communication becomes possible between the first reception unit and the second transmission unit, the first reception unit receives the second information, and such that, when communication becomes possible between the first transmission unit and the second reception unit, the first transmission unit transmits first information.

16 Claims, 17 Drawing Sheets

COMMUNICATION SYSTEM, COMMUNICATION METHOD, COMPUTER-READABLE MEDIUM AND IMAGE SHOOTING DEVICE

CROSS-REFERENCE TO RELATED APPLICATION

This application claims priority under 35 USC 119 from Japanese Patent Application No. 2007-256592, the disclosure of which is incorporated by reference herein.

BACKGROUND OF THE INVENTION

1. Field of the Invention

The present invention relates to a communication device which, as a result of two of the communication devices being disposed in a predetermined distance range and positional relationship, performs communication between each of them, a communication method, a communication program and an image shooting device.

2. Description of the Related Art

In recent years, in accompaniment with improvements in information transmitting capabilities of digital electronic still cameras (below, called "digital cameras") and mobile telephones, numerous communication devices that easily transmit audio information representing audio and image information representing images have been proposed.

For example, in Japanese Patent Application Publication (JP-A) No. 2004-228804, there is disclosed a portable image storage device that is disposed with a display unit that displays an image, a direction input unit that inputs a spatial direction in which the image that is being displayed on the display unit is to be transmitted on the basis of an instruction from a user, a wireless communication unit that has directivity, and a transmission unit that uses the wireless communication unit to transmit the image that the display unit is displaying in the spatial direction that the direction input unit has inputted.

Further, in JP-A No. 2007-142653, there is disclosed a technology where a user transmits a signal from a portable terminal with respect to a desired reception unit in an electronic device where plural reception units are disposed at predetermined intervals, and the reception device receives the signal, whereby the electronic device executes processing that corresponds to the reception unit.

However, in the technology disclosed in JP-A No. 2004-228804, when an image is transmitted, the user must perform an operation for designating the spatial direction in which the image is to be transmitted. Further, in the technology disclosed in JP-A No. 2007-142653, when communication is performed between the portable terminal and the electronic device, the portion in the portable terminal that transmits the signal must be matched to the desired reception unit of the electronic device. In this manner, in the technologies disclosed in each of these patent documents, there has been the problem that operation when performing transmission is not always easy.

SUMMARY OF THE INVENTION

The present invention has been made in view of the above circumstances and provides a communication system that can perform communication without requiring a cumbersome operation, a communication method, a communication program and an image shooting device.

A first aspect of the present invention provides a communication system including a first and a second communication devices, when the first and the second devices being disposed in a predetermined distance range and positional relationship and performing communication between each of them. The first and the second communication devices includes a first and a second transmission units that are disposed respectively on bodies of the first and the second communication devices and wirelessly transmits predetermined information to each other. The first communication device further includes a first reception unit that is disposed in a position where the first reception unit is capable of communicating with the second transmission unit and receives second information that has been transmitted from the second transmission unit, and a first control unit that controls the first communication device such that, when communication becomes possible between the first reception unit and the second transmission unit, the first reception unit receives the second information, and such that, when communication becomes possible between the first transmission unit and the second reception unit, the first transmission unit transmits first information.

An aspect of a communication method of the present invention provides a communication method of a communication system including a first and a second communication devices when the first and the second devices being disposed in a predetermined distance range and positional relationship and performing communication between each of them. The first and the second communication devices include a first and a second transmission units that are disposed respectively on bodies of the first and the second communication devices and wirelessly transmits predetermined information to each other. The first communication device further include a first reception unit of the first communication device that is disposed in a position where the first reception unit is capable of communicating with the second transmission unit and receives second information that has been transmitted from the second transmission unit. The communication method includes controlling the first communication device such that, when communication becomes possible between the first reception unit and the second transmission unit, the first reception unit receives the second information, and controlling the first communication device such that when communication becomes possible between the first transmission unit and the second reception unit, the first transmission unit transmits first information.

An aspect of the present invention provides a computer-readable medium in which is stored a communication program that is executed by a communication system including a first and a second communication devices when the first and the second devices being disposed in a predetermined distance range and positional relationship and performing communication between each of them. The first and the second communication devices includes a first and a second transmission units that are disposed respectively on bodies of the first and the second communication devices and wirelessly transmits predetermined information to each other. The first communication device further includes a first reception unit of the first communication device that is disposed in a position where the first reception unit is capable of communicating with the second transmission unit and receives second information that has been transmitted from the second transmission unit. The computer-readable medium causes a computer to execute controlling the first communication device such that, when communication becomes possible between the first reception unit and the second transmission unit, the first reception unit receives the second information, and controlling the first communication device such that when communication becomes possible between the first transmission unit and the second reception unit, the first transmission unit transmits first information.

An aspect of the present invention provides a image shooting device includes the above communication device and an image shooting unit that shoots a subject to acquire, as information to be transmitted by the communication device, image information representing the subject.

According to the present invention, communication can be performed without requiring a cumbersome operation.

BRIEF DESCRIPTION OF THE DRAWINGS

Embodiments of the present invention will be described in detail below on the basis of the drawings, wherein.

DETAILED DESCRIPTION OF THE INVENTION

Below, the best modes for implementing the present invention will be described in detail with reference to the drawings. It will be noted that, in the following embodiments, a case will be described where the present invention is applied to a digital camera.

First Embodiment

Figure 1:
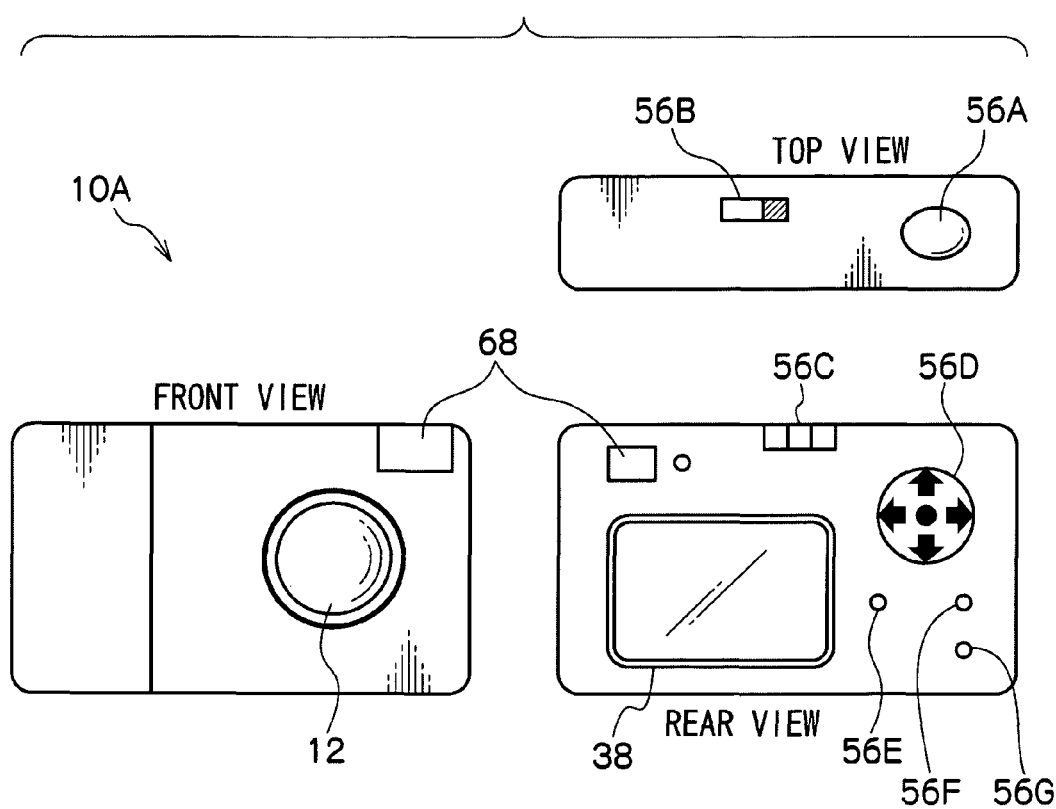
FIG. 1 is an exterior diagram showing the exterior of a digital camera pertaining to the embodiments.

FIG. 1 is an exterior diagram showing the exterior of a digital camera 10A pertaining to a first embodiment.

As shown in the same diagram, a lens 12 for imaging a subject and a finder 68 that is used in order to determine the composition of the subject to be shot are disposed on the front surface of the digital camera 10A. Further, a release button (a so-called shutter) 56A that is pressed by a photographer when executing image shooting and a power switch 56B are disposed on the top surface of the digital camera 10A.

It will be noted that the release button 56A pertaining to the present first embodiment is configured such that two stages of pressing—a state where the release button 56A is pressed to an intermediate position (below, called a "half-pressed state") and a state where the release button 56A is pressed to a final pressing position past the intermediate position (below, called a "completely pressed state")—are detectable.

Additionally, in the digital camera 10A pertaining to the present first embodiment, an automatic exposure (AE) function works and the exposure state (shutter speed, state of aperture) is set when the release button 56A is placed in the half-pressed state, thereafter an auto focus (AF) function works and focus is controlled, and thereafter exposure (image shooting) is performed when the release button 56A is next placed in the completely pressed state.

A liquid crystal display (below, called an "LCD") 38 for displaying subjects (images) represented by digital image information that has been obtained by image shooting, various types of menu screens and messages, a mode switch 56C that is slid in order to set the digital camera 10A to either an image shooting mode that is a mode that performs image shooting or a playback mode that is a mode that displays (plays back) on the LCD 38 subjects represented by digital image information that has been obtained by image shooting, and a cross-shaped cursor button 56D that is configured to include four arrow keys representing four moving directions of up, down, left and right in a display region of the LCD 38 are disposed on the rear surface of the digital camera 10A.

Further, a menu key 56E that is pressed when displaying the menu screens on the LCD 38, an enter key 56F that is pressed when executing processing that has been designated on the menu screens, and a cancel key 56G that is pressed when stopping (cancelling) various types of operations are disposed on the rear surface of the digital camera 10A.

Figure 2:
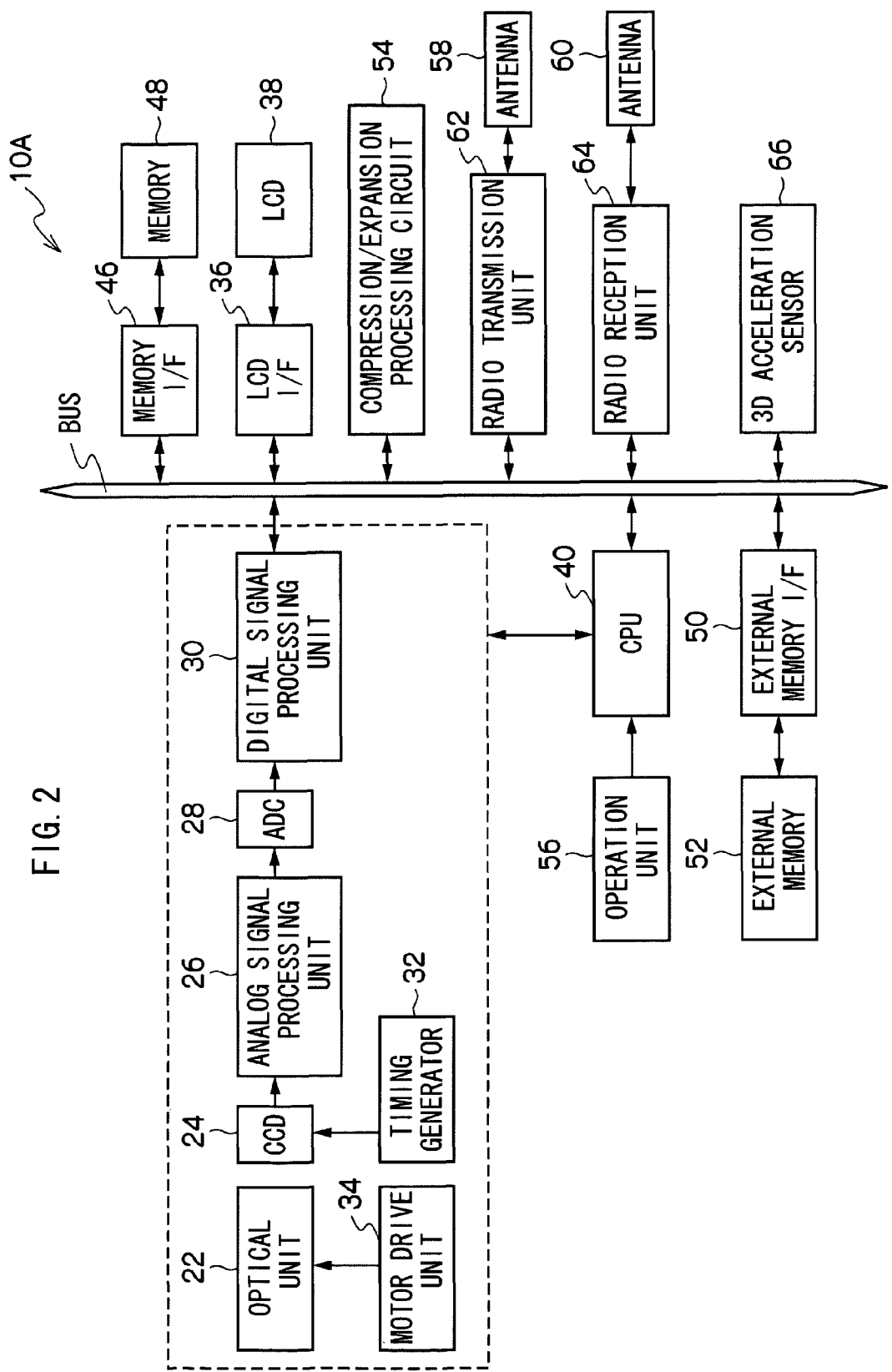
FIG. 2 is a block diagram showing the configuration of relevant electrical portions of a digital camera pertaining to a first embodiment.

FIG. 2 is a block diagram showing the configuration of relevant electrical portions of the digital camera 10A pertaining to the present first embodiment.

The digital camera 10A is configured to include an optical unit 22 that is configured to include the aforementioned lens 12, a charge-coupled device (below, called a "CCD") 24 that is disposed behind the optical axis of the lens 12, and an analog signal processing unit 26 that performs various types of analog signal processing with respect to analog signals that have been inputted thereto.

Further, the digital camera 10A is configured to include an analog/digital converter (below, called an "ADC") 28 that converts the analog signals that have been inputted thereto into digital image information and a digital signal processing unit 30 that performs various types of digital signal processing with respect to the digital image information that has been inputted thereto.

It will be noted that the digital signal processing unit 30 houses a line buffer of a predetermined capacity and also performs control that causes the digital image information that has been inputted thereto to be stored in a predetermined region of a later-described memory 48.

The output end of the CCD 24 is connected to the input end of the analog signal processing unit 26, the output end of the analog signal processing unit 26 is connected to the input end of the ADC 28, and the output end of the ADC 28 is connected to the input end of the digital signal processing unit 30. Consequently, predetermined analog signal processing is administered by the analog signal processing unit 26 to the analog signals representing a subject that have been outputted from the CCD 24, the analog signals are converted into digital image information by the ADC 28, and the digital image information is inputted to the digital signal processing unit 30.

The digital camera 10A is also configured to include an LCD interface 36 that generates a signal for causing the LCD 38 to display subjects and the menu screens and supplies this signal to the LCD 38, a central processing unit (CPU) 40 that controls operation of the entire digital camera 10A, the memory 48 in which the digital image information that has been obtained by image shooting by the CCD 24 is stored and in which various types of control programs that are executed by the CPU 40 and data are stored in advance, and a memory interface 46 that performs control of access with respect to the memory 48.

Further, the digital camera 10A is also configured to include an external memory interface 50 for enabling a portable external memory 52 to be accessed by the digital camera 10A and a compression/expansion processing circuit 54 that performs compression processing and expansion processing with respect to digital image information.

It will be noted that, in the digital camera 10A of the present first embodiment, flash memory is used as the memory 48, and SmartMedia (registered trademark) is used as the external memory 52.

Further, the digital camera 10A is configured to include antennae 58 and 60, a radio transmission unit 62, a radio reception unit 64 and a three-dimensional acceleration sensor (below, called a "3D acceleration sensor") 66.

The radio transmission unit 62 is disposed on one end portion of the digital camera 10A and wirelessly transmits predetermined information via the antenna 58. It will be noted that, in the digital camera 10A pertaining to the present first embodiment, the aforementioned digital image information is applied as the predetermined information. Further, in the digital camera 10A pertaining to the present first embodiment, when a predetermined condition is satisfied, radio waves of a predetermined frequency and predetermined strength are transmitted by the radio transmission unit 62, and the predetermined information is transmitted by the radio waves.

Further, the radio reception unit 64 is, when another of the digital cameras 10A is disposed in a predetermined distance range and positional relationship, disposed in a position where the radio reception unit 64 is capable of communicating with the radio transmission unit 62 that is disposed in the other digital camera 10A and receives, via the antenna 60, information that has been transmitted by the radio transmission unit 62 that is disposed in the other digital camera 10A.

Further, the 3D acceleration sensor 66 detects, when the digital camera 10A has moved, acceleration of the movement.

It will be noted that, in the digital camera 10A pertaining to the present first embodiment, the radio transmission unit 62 also includes, in addition to the function of transmitting radio waves, the function of receiving later-described transmission permission information via the antenna 58. Further, the radio reception unit 64 also includes, in addition to the function of receiving radio waves, the function of receiving later-described transmission permission information via the antenna 60.

The digital signal processing unit 30, the LCD interface 36, the CPU 40, the memory interface 46, the external memory interface 50, the compression/expansion processing circuit 54, the radio transmission unit 62, the radio reception unit 64 and the 3D acceleration sensor 66 are all interconnected via a bus. Consequently, the CPU 40 can respectively perform control of the operation of each of the digital signal processing unit 30, the compression/expansion processing circuit 54, the radio transmission unit 62 and the radio reception unit 64, acquisition of the detection result of the 3D acceleration sensor 66, display of various types of information via the LCD interface 36 with respect to the LCD 38, and access of the memory 48 and the external memory 52 via the memory interface 46 and the external memory interface 50.

A timing generator 32 that mainly generates a timing signal for driving the CCD 24 and supplies this timing signal to the CCD 24 is disposed in the digital camera 10A, and the driving of the CCD 24 is controlled by the CPU 40 via the timing generator 32.

Further, a motor drive unit 34 is disposed in the digital camera 10A, and the driving of a focus adjusting motor, a zoom motor and an aperture drive motor that are disposed in the optical unit 22 but are not shown is also controlled by the CPU 40 via the motor drive unit 34.

That is, the lens 12 pertaining to the present first embodiment includes plural lenses, is configured as a zoom lens whose focal distance is capable of being changed (magnified), and is disposed with an unillustrated lens drive mechanism. The focus adjusting motor, the zoom motor and the aperture drive motor are included in this lens drive mechanism, and these motors are driven by drive signals supplied from the motor drive unit 50 by the control of the CPU 40.

Moreover, buttons, switches and keys, such as the release button 56A, the power switch 56B, the mode switch 56C, the cross-shaped cursor button 56D and the menu key 56E (in the same diagram, collectively called "operation units 56"), are connected to the CPU 40, and the CPU 40 can always understand the operating state with respect to these operation units 56.

Figure 3:
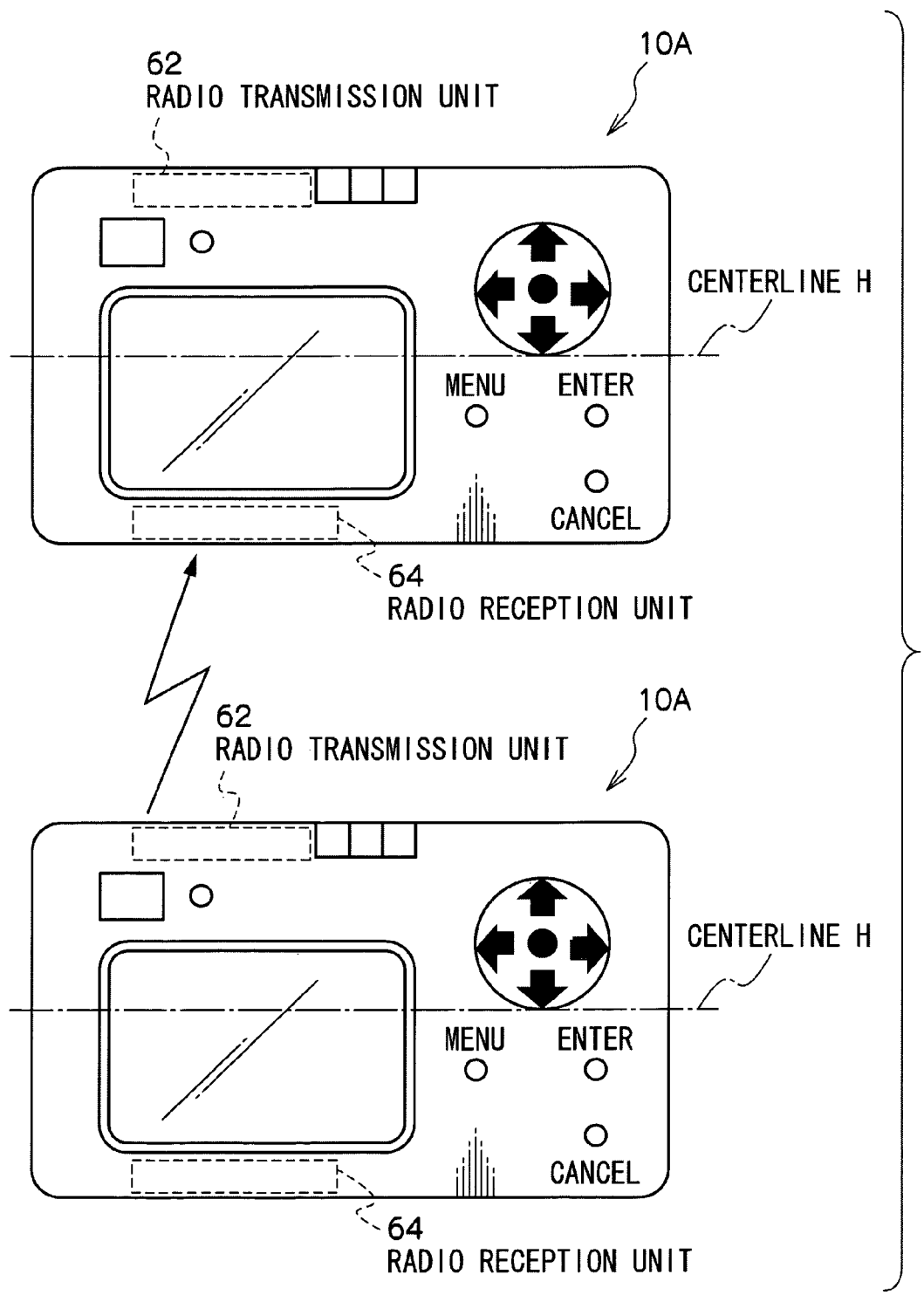
FIG. 3 is a general diagram showing an example of a radio transmission unit and a radio reception unit in the digital camera pertaining to the first embodiment.

Incidentally, in the digital camera 10A pertaining to the present first embodiment, as shown in FIG. 3 for example, the radio transmission unit 62 is disposed in the upper end portion of the digital camera 10A and the radio reception unit 64 is disposed in the bottom end portion of the digital camera 10A such that they are in line-symmetrical positions using as a boundary a horizontal plane (not shown) that passes through a centerline H with respect to the vertical direction of the digital camera 10A.

Additionally, by orienting two of the digital cameras 10A so as to face the same direction and by placing the bottom surface of the other digital cameras 10A on the top surface of the one digital camera 10A, it becomes possible for the radio reception unit 64 of the other digital camera 10A to receive radio waves transmitted from the radio transmission unit 62 of the one digital camera 10A.

It will be noted that, as for the placement position of the other digital camera 10A in this case, the other digital camera 10A is placed such that the radio transmission unit 62 of the one digital camera 10A and the radio reception unit 64 of the other digital camera 10A face each other. Consequently, the aforementioned predetermined strength is a configured to be a strength where communication is possible between each of the digital cameras 10A when the other digital camera 10A is placed in this manner.

It will be noted that the placement position is not limited to this and that the predetermined strength may also be set such that, even when the radio transmission unit 62 of the one digital camera 10A and the radio reception unit 64 of the other digital camera 10A do not completely face each other, the placement position of the one digital camera 10A permits a certain extent of shifting. In that case, the placement position may also be configured to accommodate a case where there is a predetermined space between the one digital camera 10A and the other digital camera 10A (e.g., the state shown in FIG. 3).

Further, in the digital camera 10A pertaining to the present first embodiment, a case is described where the radio transmission unit 62 is disposed in the upper end portion of the digital camera 10A and the radio reception unit 64 is disposed in the bottom end portion of the digital camera 10A such that they are in line-symmetrical positions using as a boundary a horizontal plane (not shown) that passes through the centerline H with respect to the vertical direction of the digital camera 10A, but the radio transmission unit 62 may also be disposed in the upper end portion of the digital camera 10A and the radio reception unit 64 may also be disposed in the bottom end portion of the digital camera 10A such that they are in substantially line-symmetrical positions using as a boundary a horizontal plane (not shown) that passes through the centerline H with respect to the vertical direction of the digital camera 10A.

In this manner, as a result of two of the digital cameras 10A being disposed in a predetermined distance range and positional relationship, communication is performed between the one digital camera 10A and the other digital camera 10A.

Next, overall operation of the digital camera 10A pertaining to the present first embodiment during image shooting will be briefly described.

First, the CCD 24 performs image shooting via the optical unit 22 and sequentially outputs analog signals of red (R), green (G) and blue (B) that represent a subject to the analog signal processing unit 26. The analog signal processing unit 26 administers analog signal processing such as correlated double sampling processing with respect to the analog signals that have been inputted from the CCD 24 and sequentially outputs the signals to the ADC 28.

The ADC 28 converts the analog signals of R, G and B that have been inputted from the analog signal processing unit 26 into R, G and B signals (digital image information) of a predetermined number of bits each and sequentially outputs the digital image information to the digital signal processing unit 30. The digital signal processing unit 30 accumulates the digital image information that is sequentially inputted from the ADC 28 in the line buffer housed in the digital signal processing unit 30 and directly stores the digital image information in a predetermined region of the memory 48.

The digital image information that has been stored in the predetermined region of the memory 48 is read by the digital signal processing unit 30 in response to control by the CPU 40, white balance adjustment is performed by applying digital gains of R, G and B that correspond to predetermined physical quantities, and gamma processing and sharpness processing are performed to generate digital image information of a predetermined number of bits.

Then, the digital signal processing unit 30 administers YC signal processing with respect to the digital image information that has been generated to generate a brightness signal Y and chroma signals Cr and Cb (below, called "YC signals"), and the digital signal processing unit 30 stores the YC signals in a predetermined region that is different from the predetermined region of the memory 48.

It will be noted that the LCD 38 is configured as a display that can be used as a finder by displaying a moving image (a through image) that has been obtained by continuous image shooting by the CCD 24, and when the LCD 38 is used as a finder, the YC signals that have been generated are sequentially outputted to the LCD 38 via the LCD interface 36. Thus, a through image is displayed on the LCD 38.

Here, the AE function works and the exposure state is set as mentioned before at a timing when the release button 56A is placed in the half-pressed state by a user, thereafter the AF function works and focus is controlled, and thereafter, at a timing when the release button 56A is next placed in the completely pressed state, the YC signals stored in the second memory 48 at that point in time are compressed in a predetermined compression format (in the present first embodiment, the JPEG format) by the compression/expansion processing circuit 54 and are thereafter recorded as an image file (an electronic file) in the external memory 52 via the external memory interface 50.

Next, action when one digital camera 10A of two of the digital cameras 10A pertaining to the present first embodiment transmits information by the radio transmission unit 62 and the other digital camera 10A receives the information by the radio reception unit 64 will be described.

Figure 4:
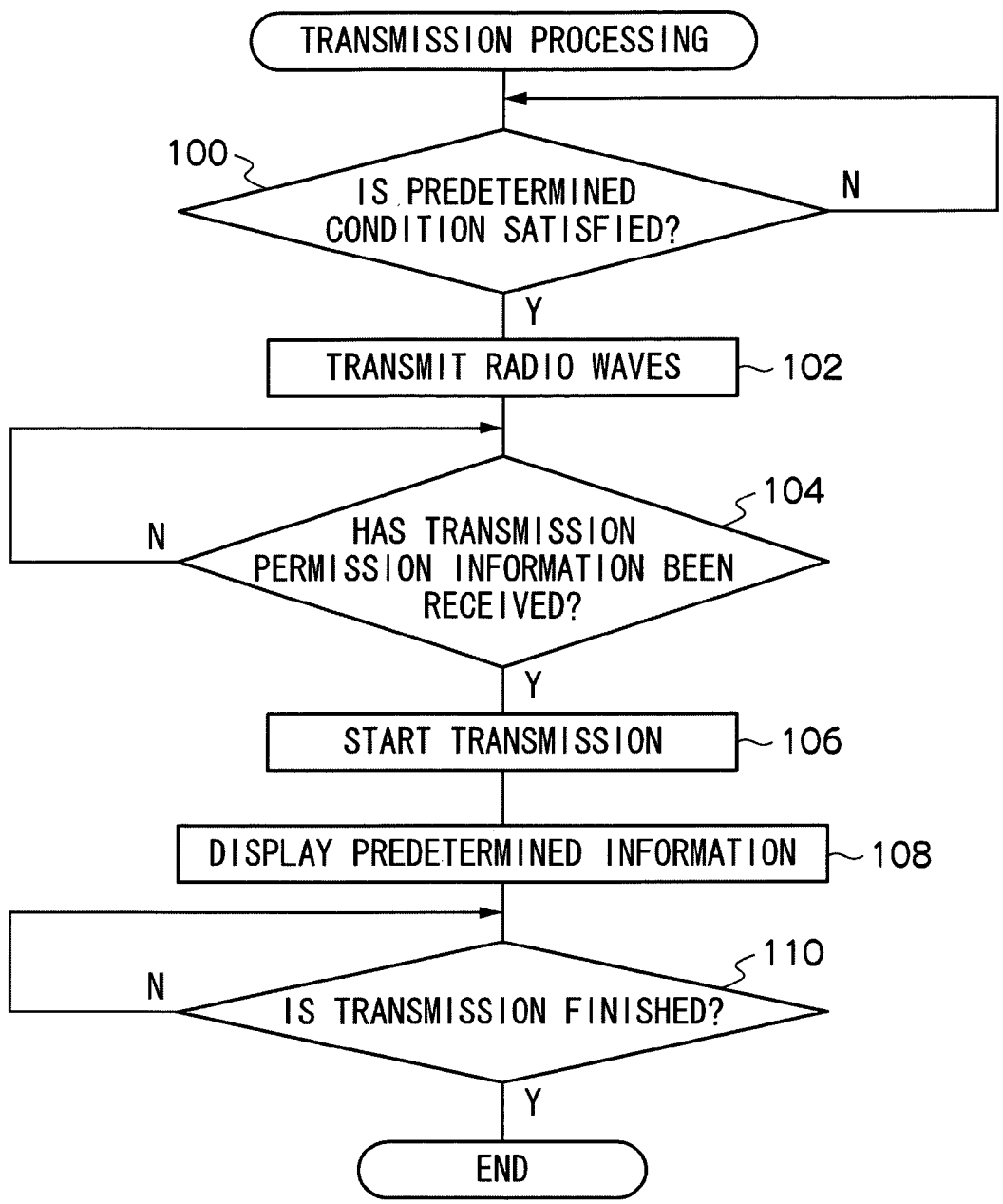
FIG. 4 is a flowchart showing a flow of processing by a transmission processing program pertaining to the first embodiment.

First, action when the digital camera 10A pertaining to the present first embodiment performs transmission of information by the radio transmission unit 62 will be described with reference to FIG. 4. It will be noted that FIG. 4 is a flowchart showing a flow of processing by a transmission processing program that is executed by the CPU 40 of the digital camera 10A every predetermined time period (e.g., every one second). This program is stored in advance in a predetermined region of the memory 48.

In step 100 of the same diagram, the flow stands by until a predetermined condition is satisfied. It will be noted that, in the digital camera 10A pertaining to the present first embodiment, a condition where the playback mode is set and the acceleration that has been detected by the 3D acceleration sensor 66 is equal to or less than a predetermined threshold is applied as the predetermined condition.

In the next step 102, the radio transmission unit 62 is caused to transmit predetermined radio waves indicating that the digital camera 10A wishes to perform communication. Thereafter, the flow moves to step 104. When the predetermined radio waves are sent by the processing of step 102, when the one digital camera 10A and the other digital camera 10A are disposed in the predetermined distance range and positional relationship, then the transmission permission information is transmitted from the radio reception unit 64 of the other digital camera 10A as described later.

Thus, in step 104, reception of the transmission permission information that is transmitted from the radio reception unit 64 of the other digital camera 10A is waited upon. In the next step 106, the radio transmission unit 62 is controlled such that the radio transmission unit 62 starts transmission of the predetermined information. It will be noted that, in the digital camera 10A pertaining to the present first embodiment, processing to control the radio transmission unit 62 such that the radio transmission unit 62 transmits digital image information representing an image that is being displayed on the LCD 38 at this point in time is applied as the processing of step 106.

In step 108, the LCD 38 is controlled such that the LCD 38 is caused to display information indicating that information is being transmitted with respect to the other digital camera 10A. It will be noted that, in the digital camera 10A pertaining to the present first embodiment, processing to control the LCD 38 such that the LCD 38 is caused to display animation indicating that information is currently being transmitted is applied as the processing of step 108, but the processing is not limited to this; for example, it goes without saying that processing to control the LCD 38 such that the LCD 38 is caused to display characters indicating that information is currently being transmitted or processing to control a speaker (not shown) such that the speaker outputs audio indicating that information is currently being transmitted can also be applied.

In the next step 110, it is determined whether or not transmission of the information has ended. When the determination is YES, then the present transmission processing program ends.

Figure 5:
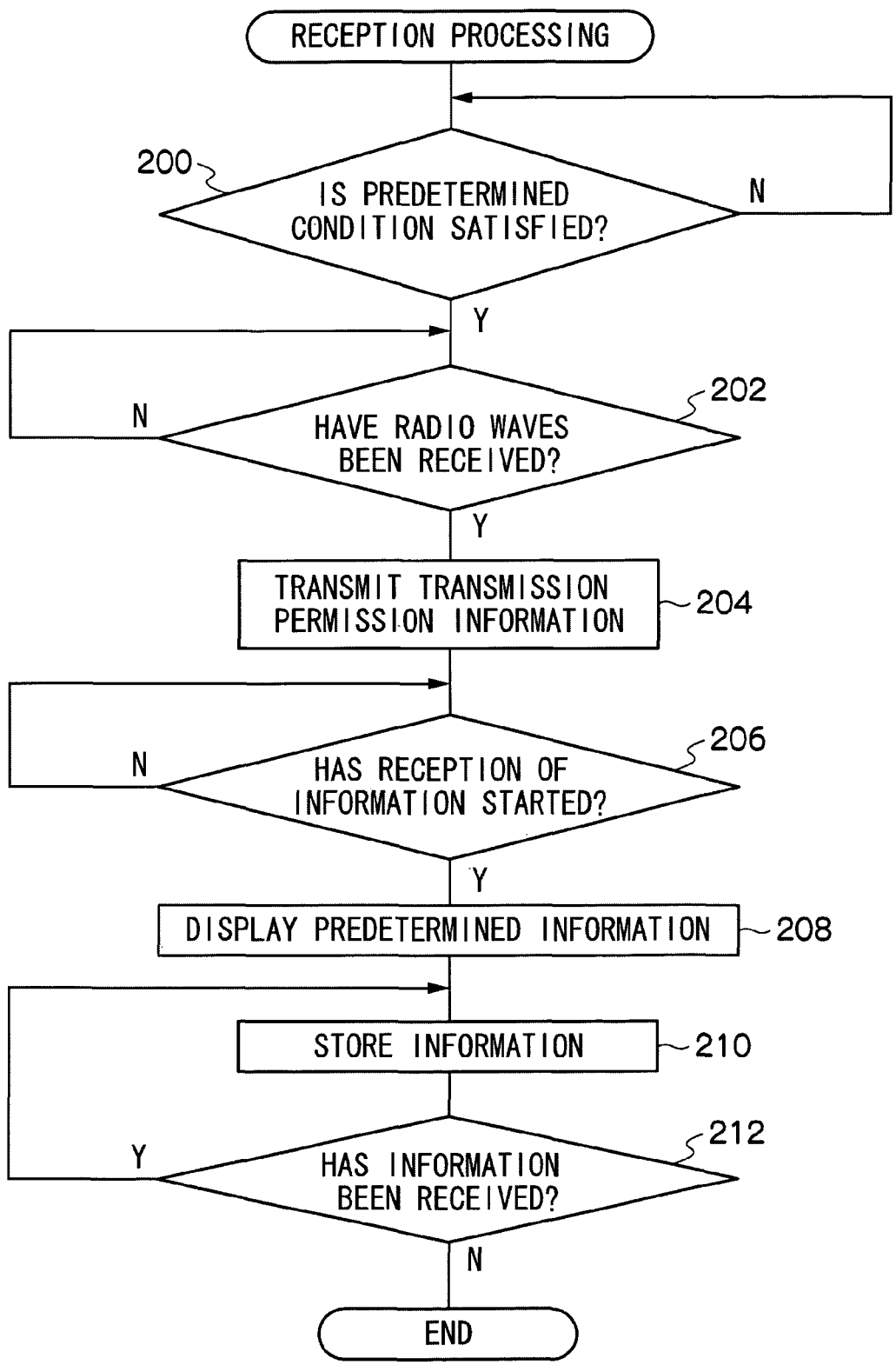
FIG. 5 is a flowchart showing a flow of processing by a reception processing program pertaining to the first embodiment.

Next, action when the digital camera 10A pertaining to the present first embodiment performs reception of information by the radio reception unit 64 will be described with reference to FIG. 5. It will be noted that FIG. 5 is a flowchart showing a flow of processing by a reception processing program that is executed by the CPU 40 of the digital camera 10A every predetermined time period (e.g., every one second). This program is stored in advance in a predetermined region of the memory 48.

In step 200 of the same diagram, the flow stands by until the aforementioned predetermined condition is satisfied.

In the next step 202, reception of the radio waves that the radio transmission unit 62 has been caused to transmit by the processing of step 102 of the aforementioned transmission processing program is waited upon.

In the next step 204, the radio reception unit 64 is controlled such that the radio reception unit 64 transmits the transmission permission information indicating that transmission of the predetermined information will be permitted.

In the next step 206, the flow stands by until the start of reception of the predetermined information that has been transmitted by the processing of step 106 of the aforementioned transmission processing program is performed.

In step 208, the LCD 38 is controlled such that the LCD 38 is caused to display information indicating that information is being received from the one digital camera 10A. It will be noted that, in the digital camera 10A pertaining to the present first embodiment, processing to control the LCD 38 such that the LCD 38 is caused to display animation indicating that information is currently being received is applied as the processing of step 208, but the processing is not limited to this; for example, it goes without saying that processing to control the LCD 38 such that the LCD 38 is caused to display characters indicating that information is currently being received or processing to control a speaker (not shown) such that the speaker outputs audio indicating that information is currently being received can also be applied.

In step 210, the information that has been received is stored in the external memory 52. Thereafter, the flow moves to step 212.

In step 212, it is determined whether or not information is being received. When the determination is YES, then the flow returns to step 210. When the determination is NO, then the present reception processing program ends.

It will be noted that, in the present first embodiment, step 106 corresponds to a transmission control step of the present invention and step 206 corresponds to a reception control step of the present invention.

As described in detail above, according to the present embodiment, the radio transmission unit 62 that is disposed on one end portion of the digital camera 10A wirelessly transmits predetermined information (here, digital image information), the radio reception unit 64 which, when another of the digital cameras 10A is disposed in the predetermined distance range and positional relationship, is disposed in a position where the radio reception unit 64 is capable of communicating with the radio transmission unit 62 that is disposed in the other digital camera 10A receives information that has been transmitted by the radio transmission unit 62 that is disposed in the other digital camera 10A, and the CPU 40 controls the digital camera 10A such that, when communication becomes possible between the radio reception unit 64 and the radio transmission unit 62 that is disposed in the other digital camera 10A, reception of the information is performed by the radio reception unit 64 and such that, when communication becomes possible between the radio transmission unit 62 and the radio reception unit 64 that is disposed in the other digital camera 10A, transmission of the information is performed by the radio transmission unit 62; thus, communication can be performed without requiring a cumbersome operation.

Further, according to the present embodiment, the CPU 40 control the digital camera 10A such that, when an operation mode other than an operation mode (here, the playback mode) that performs communication with the other digital camera 10A is set, the communication is prohibited; thus, when a mode that does not perform communication is set, a situation where unnecessary transmission is performed can be prevented.

Further, the 3D acceleration sensor 66 detects, when the digital camera 10A has moved, acceleration of the movement, and the CPU 40 controls the digital camera 10 such that, when the acceleration that has been detected by the 3D acceleration sensor 66 exceeds a predetermined threshold, communication with the other digital camera 10A is prohibited; thus, a situation where unnecessary communication is performed can be prevented.

Moreover, the CPU 40 controls the digital camera 10A such that, when the digital camera 10A is transmitting information with respect to the other digital camera 10A, the digital camera 10A displays information indicating that the digital camera 10A is transmitting information and such that, when the digital camera 10A is receiving information from the other digital camera 10A, the digital camera 10A displays information indicating that the digital camera 10A is receiving the information; thus, a user can easily understand whether the digital camera 10A is transmitting or receiving information.

Second Embodiment

In the first embodiment, a case has been described where information is transmitted utilizing the radio transmission unit 62, but in a second embodiment, a case will be described where information is transmitted utilizing wireless fidelity (WiFi).

Figure 6:
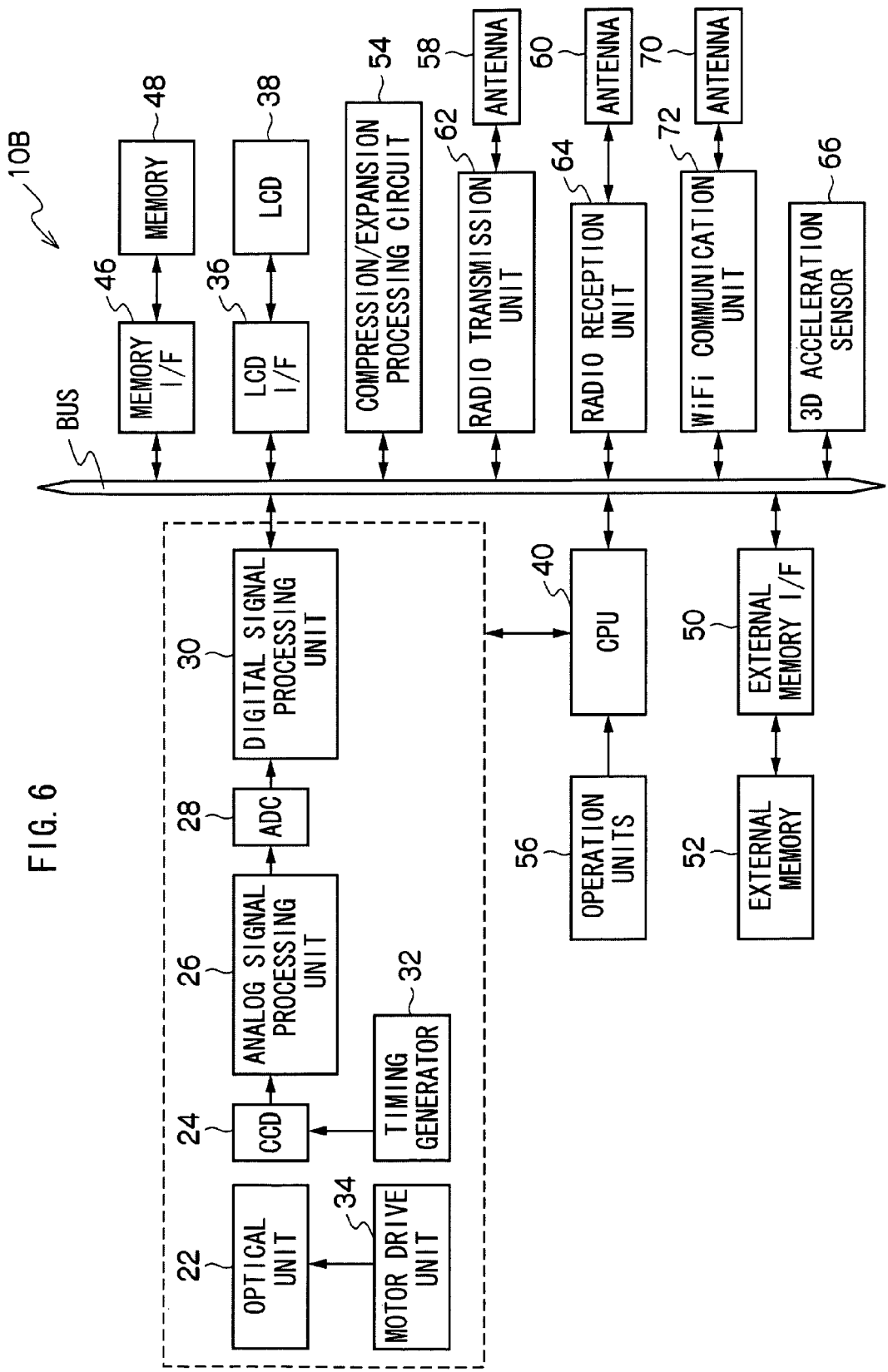
FIG. 6 is a block diagram showing the configuration of relevant electrical portions of a digital camera pertaining to a second embodiment.

First, the configuration of a digital camera 10B pertaining to the present embodiment will be described with reference to FIG. 6. It will be noted that reference numerals that are the same as those in FIG. 2 will be given to configural elements in FIG. 6 that are the same as those in FIG. 2 and that description of those same configural elements will be omitted.

As shown in the same diagram, the digital camera 10B is configured to include an antenna 70 and a WiFi communication unit 72 that is connected to the antenna 70.

The WiFi communication unit 72 has a faster communication speed and a longer communicable distance than those of the radio transmission unit 62, wirelessly transmits second information via the antenna 70, and receives, via the antenna 70, the second information that has been transmitted by the WiFi communication unit 72 that is disposed in another of the digital cameras 10B. It will be noted that, in the digital camera 10B, the digital image information that has been described in the first embodiment is applied as the second information.

Figure 7:
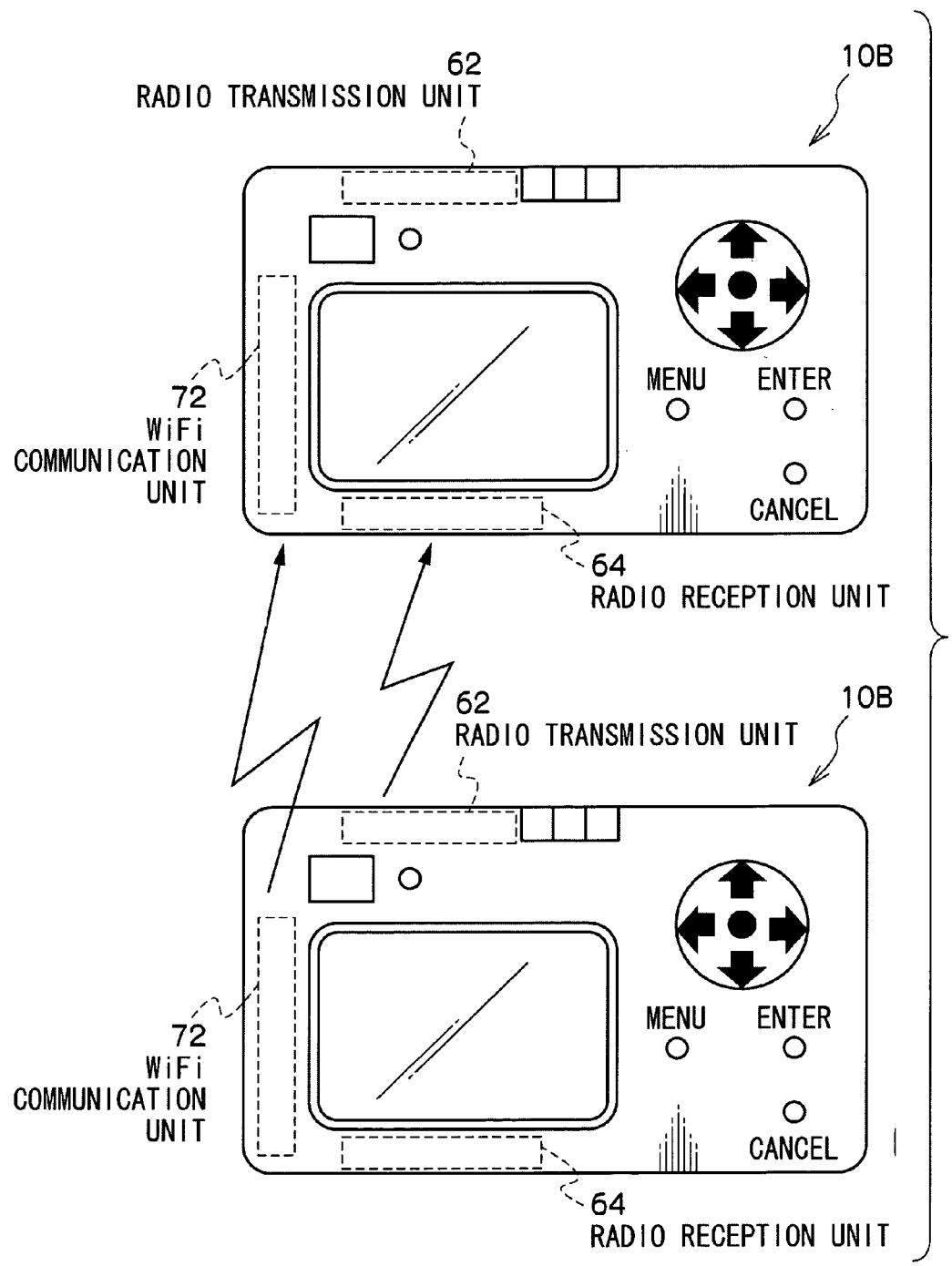
FIG. 7 is a general diagram showing an example of a radio transmission unit, a radio reception unit and a WiFi transmission unit in the digital camera pertaining to the second embodiment.

Incidentally, in the digital camera 10B, as shown in FIG. 7 for example, the radio transmission unit 62 and the radio reception unit 64 are disposed in the same positions as those of the digital camera 10A of the first embodiment, and the WiFi communication unit 72 is disposed in the left side end portion of the digital camera 10B when seen from the rear.

Next, action when one digital camera 10B of two of the digital cameras 10B transmits the second information by the WiFi communication unit 72 and the other digital camera 10B receives that information by the WiFi communication unit 72 will be described.

Figure 8:
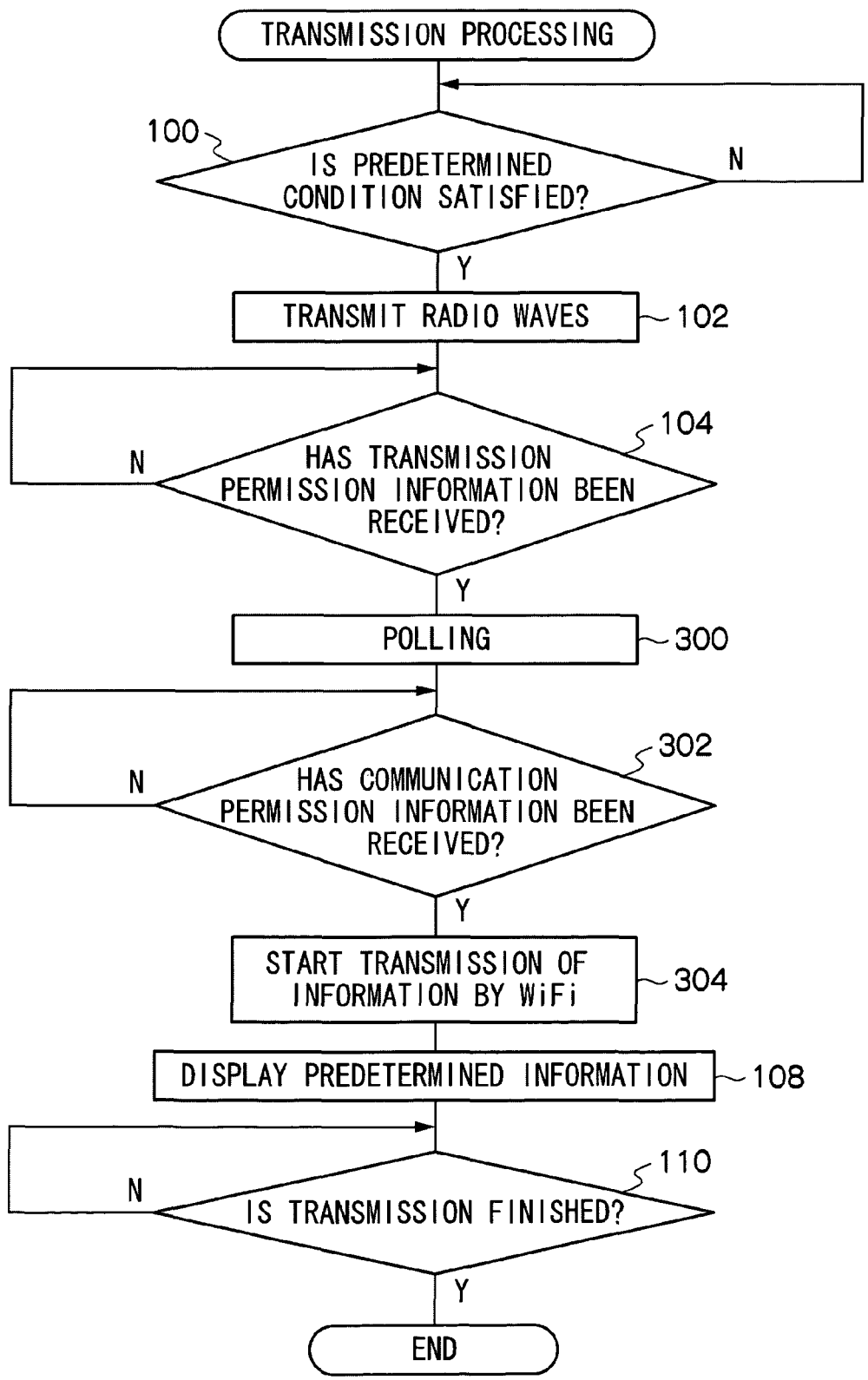
FIG. 8 is a flowchart showing a flow of processing by a transmission processing program pertaining to the second embodiment.

First, action when the digital camera 10B pertaining to the present embodiment performs transmission of the second information by the WiFi communication unit 72 will be described with reference to FIG. 8. It will be noted that FIG. 8 is a flowchart showing a flow of processing by a transmission processing program that is executed by the CPU 40 of the digital camera 10B every predetermined time interval (e.g., every one second). This program is stored in advance in a predetermined region of the memory 48. Further, step numbers that are the same as those in FIG. 4 will be given to steps in FIG. 8 that perform processing that is the same as the processing of the steps of the program shown in FIG. 4, and description of those same steps will be omitted.

When the determination is YES in step 104 of the same diagram, then the flow moves to step 300, where communication (polling) requesting provision of later-described communication permission information is performed with respect to the other digital camera 10B using the WiFi communication unit 72. Thereafter, the flow moves to step 302. Because of the polling that is performed by the processing of step 300, the communication permission information is transmitted from the WiFi communication unit 72 of the other digital camera 10B as described later.

Thus, in step 302, reception of the communication permission information that is transmitted from the WiFi communication unit 72 of the other digital camera 10B is waited upon.

In the next step 304, the WiFi communication unit 72 is controlled such that the WiFi communication unit 72 starts transmission of the second information. It will be noted that, in the digital camera 10B pertaining to the present embodiment, processing to control the WiFi communication unit 72 such that the WiFi communication unit 72 transmits digital image information representing an image that is being displayed on the LCD 38 at this point in time is applied as the processing of step 304.

Figure 9:
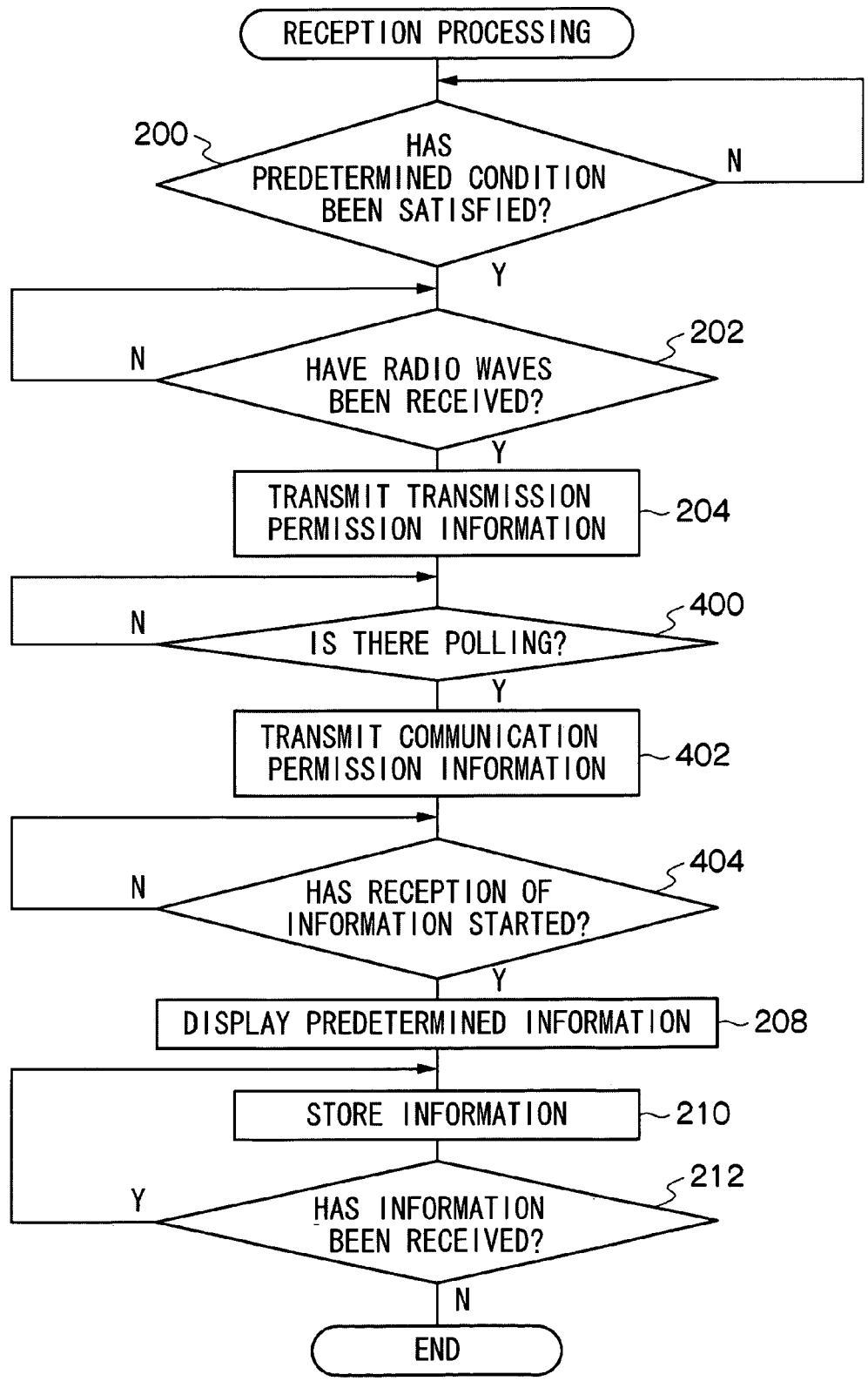
FIG. 9 is a flowchart showing a flow of processing by a reception processing program pertaining to the second embodiment.

Next, action when the digital camera 10B performs reception of the second information by the WiFi communication unit 72 will be described with reference to FIG. 9. It will be noted that FIG. 9 is a flowchart showing a flow of processing by a reception processing program that is executed by the CPU 40 of the digital camera 10B every predetermined time interval (e.g., every one second). This program is stored in advance in a predetermined region of the memory 48. Further, step numbers that are the same as those in FIG. 5 will be given to steps in FIG. 9 that perform processing that is the same as the processing of the steps of the program shown in FIG. 5, and description of those same steps will be omitted.

In step 400 of the same diagram, polling from the one digital camera 10B pertaining to the present embodiment is waited upon.

In the next step 402, the WiFi communication unit 72 is controlled such that the WiFi communication unit 72 transmits the communication permission information indicating that communication by the WiFi communication unit 72 will be permitted.

In the next step 404, the flow stands by until the start of reception of the second information that has been transmitted by the processing of step 304 of the aforementioned transmission processing program pertaining to the present embodiment is performed.

Figure 10:
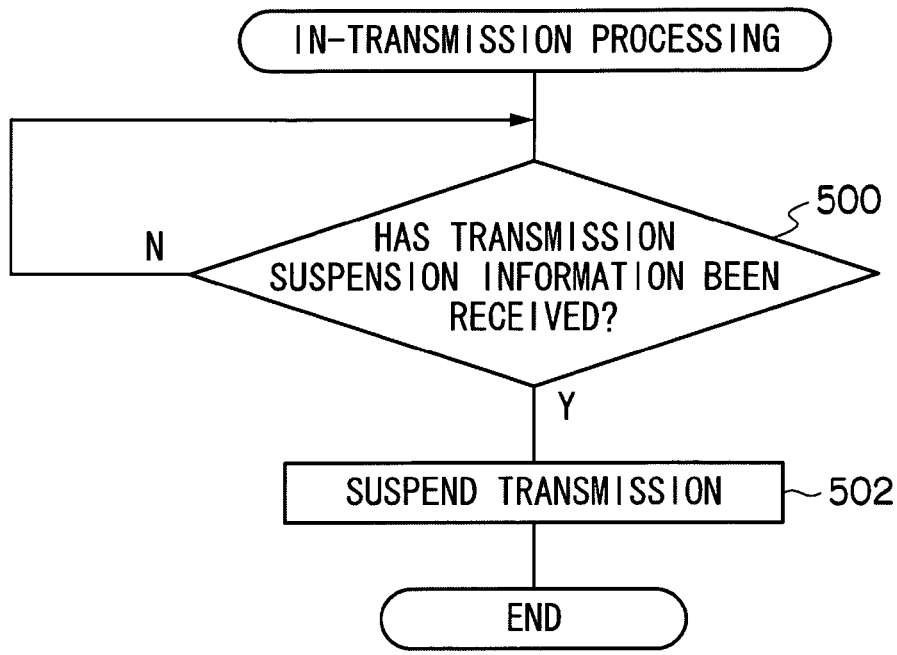
FIG. 10 is a flowchart showing a flow of processing by an in-transmission processing program pertaining to the second embodiment.

Next, action while the digital camera 10B is transmitting the second information will be described with reference to FIG. 10. It will be noted that FIG. 10 is a flowchart showing a flow of processing by an in-transmission processing program that is executed by the CPU 40 of the digital camera 10B while the digital camera 10B is transmitting the second information. This program is stored in advance in a predetermined region of the memory 48.

In step 500 of the same diagram, reception via the WiFi communication unit 72 of later-described transmission suspension information that is transmitted from the other digital camera 10B is waited upon.

In the next step 502, transmission of the second information by the WiFi communication unit 72 is suspended. Thereafter, the present in-transmission processing program ends.

Figure 11:
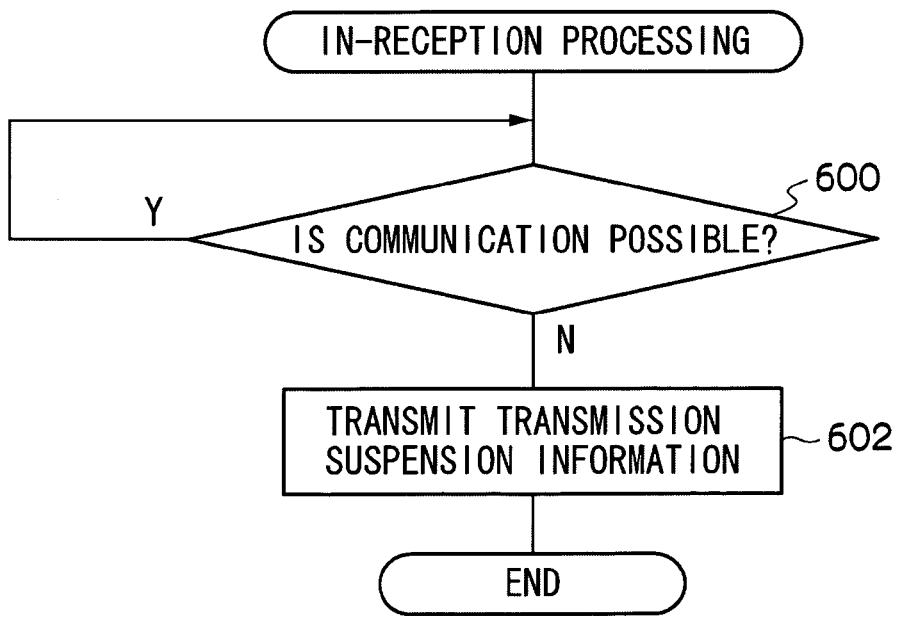
FIG. 11 is a flowchart showing a flow of processing by an in-reception processing program pertaining to the second embodiment.

Next, action while the digital camera 10B is receiving the second information will be described with reference to FIG. 11. It will be noted that FIG. 11 is a flowchart showing a flow of processing by an in-reception processing program that is executed by the CPU 40 of the digital camera 10B while the digital camera 10B is receiving the second information. This program is stored in advance in a predetermined region of the memory 48.

In step 600 of the same diagram, the flow stands by until communication becomes impossible. It will be noted that, in the other digital camera 10B pertaining to the present embodiment, as the processing of step 600, the flow stands by until radio waves that are transmitted by the radio transmission unit 62 of the other digital camera 10B are no longer received by the radio reception unit 64.

In step 602, the WiFi communication unit 72 is controlled such that the WiFi communication unit 72 transmits the transmission suspension information instructing suspension of transmission of the second information. Thereafter, the present in-reception processing program ends.

As described in detail above, according to the present embodiment, the CPU 40 controls the digital camera 10B such that, when communication becomes possible between the radio reception unit 64 and the radio transmission unit 62 that is disposed in the other digital camera 10B, reception of the second information (here, digital image information) is performed by the WiFi communication unit 72 and such that, when communication becomes possible between the radio transmission unit 62 and the radio reception unit 64 that is disposed in the other digital camera 10B, transmission of the second information is performed by the WiFi communication unit 72; thus, communication capability can be improved.

Further, according to the present embodiment, the CPU 40 controls the digital camera 10B such that, when communication becomes impossible between the radio reception unit 64 and the radio transmission unit 62 that is disposed in the other digital camera 10B while reception of the second information is being performed by the WiFi communication unit 72, reception of the second information by the WiFi communication unit 72 is suspended and such that, when communication becomes impossible between the radio transmission unit 62 and the radio reception unit 64 that is disposed in the other digital camera 10B while transmission of the second information is being performed by the WiFi communication unit 72, transmission of the second information by the WiFi communication unit 72 is suspended; thus, control of unnecessary communication can be stopped.

Third Embodiment

In a third embodiment, a case will be described where plural pieces of digital image information are transmitted. It will be noted that the configuration of the digital camera pertaining to the present embodiment is the same as the configuration of the digital camera 10B pertaining to the second embodiment, so description thereof will be omitted. Further, below, just the point that is different from the second embodiment will be described.

Figure 12:
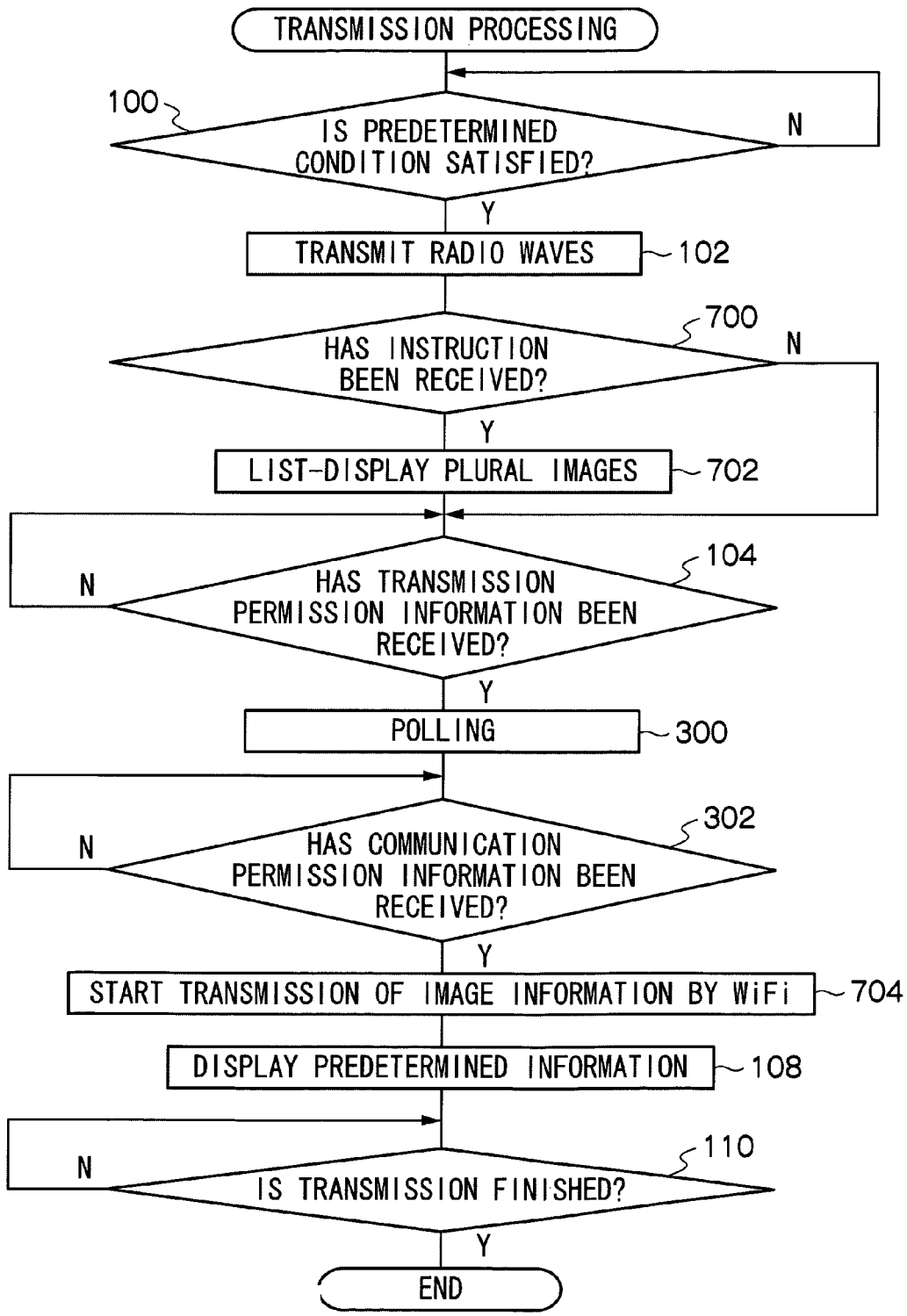
FIG. 12 is a flowchart showing a flow of processing by a transmission processing program pertaining to a third embodiment.

Next, action when one digital camera 10B of two of the digital cameras 10B pertaining to the present embodiment transmits digital image information to the other digital camera 10B will be described with reference to FIG. 12. It will be noted that FIG. 12 is a flowchart showing a flow of processing by a transmission processing program that is executed by the CPU 40 of the digital camera 10B every predetermined time interval (e.g., every one second). This program is stored in advance in a predetermined region of the memory 48. Further, step numbers that are the same as those in FIG. 8 will be given to steps in FIG. 12 that perform processing that is the same as the processing of the steps of the program shown in FIG. 8, and description of those same steps will be omitted.

In step 700 of the same diagram, it is determined whether or not an instruction that causes the LCD 38 to arrange and list-display plural images has been received by the operation units 56. When the determination is YES, then the flow moves to step 702. When the determination is NO, then the flow moves to step 104.

In step 702, the LCD 38 is caused to arrange and list-display plural images. Thereafter, the flow moves to step 104.

In step 704, the WiFi communication unit 72 is controlled such that the WiFi communication unit 72 starts transmission of digital image information representing the images that are being displayed on the LCD 38 at this point in time. Thereafter, the flow moves to step 108. For example, when nine images are being displayed on the LCD 38, processing to control the WiFi communication unit 72 such that the WiFi communication unit 72 transmits digital image information representing each of those nine images is applied as the processing of step 704.

As described in detail above, according to the present embodiment, the LCD 38 displays images represented by digital image information, and the CPU 40 uses the digital image information representing the images that are being displayed by the LCD 38 as information that is to be transmitted with respect to the other digital camera 10B; thus, desired images can be easily provided to another digital camera 10B.

Fourth Embodiment

In a fourth embodiment, a case will be described where, when acceleration when the digital camera has been moved is a predetermined state regardless of the magnitude of that acceleration, information that corresponds to the state is transmitted with respect to the other digital camera.

It will be noted that the configuration of the digital camera pertaining to the present embodiment is the same as the configuration of the digital camera 10B pertaining to the second embodiment, so description thereof will be omitted. Further, below, just the point that is different from the second embodiment will be described.

Incidentally, in the digital camera 10B pertaining to the present embodiment, by performing a predetermined operation with respect to the operation units 56, the digital camera 10B can be set to a correlating mode that is a mode that correlates and registers the state of the acceleration that has been detected by the 3D acceleration sensor 66 and the type of information that is to be transmitted with respect to the other digital camera 10B and which has been designated by a user.

Figure 13:
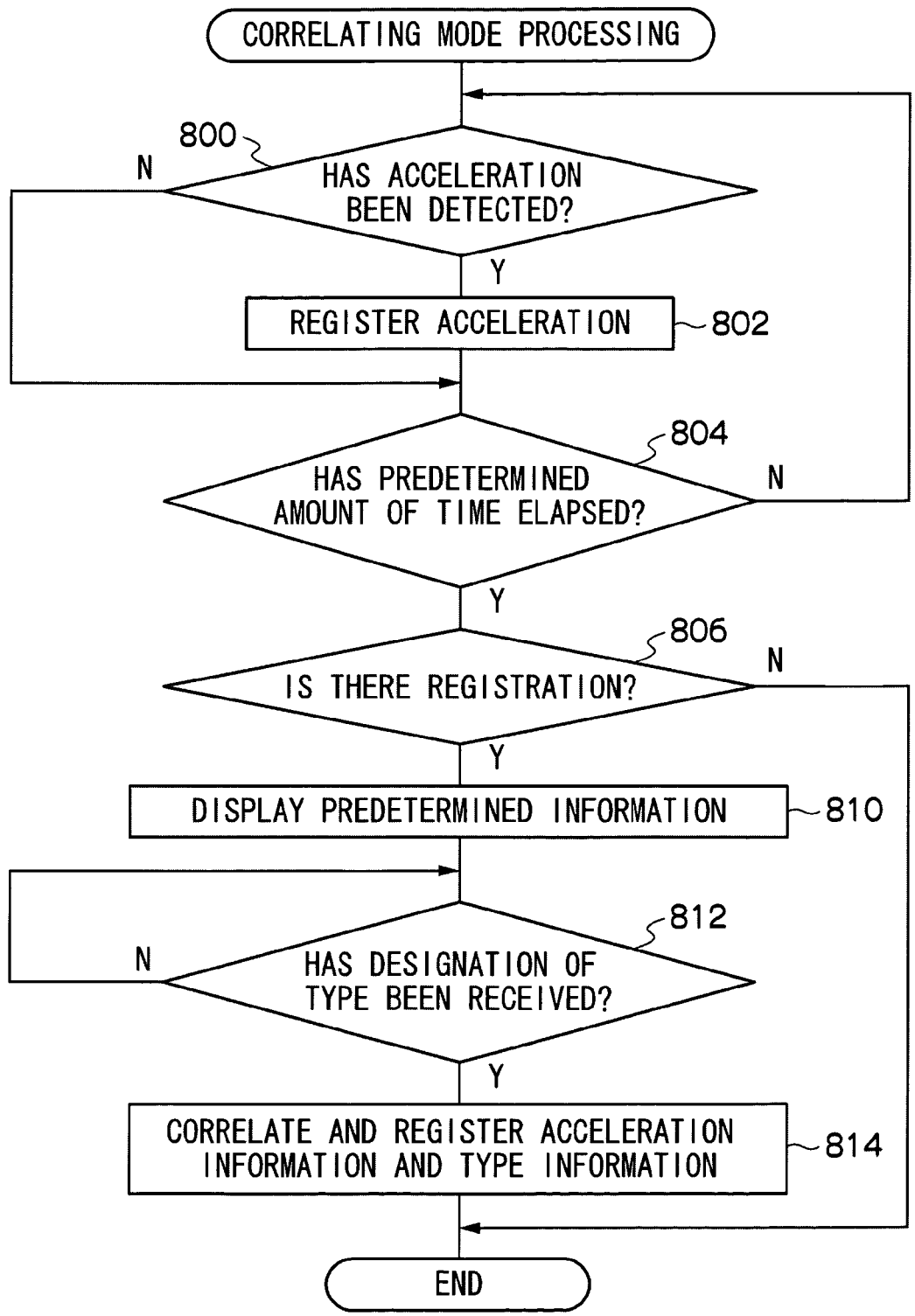
FIG. 13 is a flowchart showing a flow of processing by a correlating mode processing program pertaining to a fourth embodiment.

Next, the action of the digital camera 10B will be described with reference to FIG. 13. It will be noted that FIG. 13 is a flowchart showing a flow of processing by a correlating mode processing program that is executed by the CPU 40 of the digital camera 10B when the correlating mode has been set in the digital camera 10B. This program is stored in advance in a predetermined region of the memory 48.

In step 800 of the same diagram, it is determined whether or not acceleration equal to or greater than a predetermined value has been detected by the 3D acceleration sensor 66. When the determination is YES, then the flow moves to step 802. When the determination is NO, then the flow moves to step 804.

In step 802, acceleration information representing the state of the acceleration that has been detected by the processing of step 800 is registered by being stored in the memory 48. In the next step 804, it is determined whether or not a predetermined amount of time (e.g., twenty seconds) has elapsed after the correlating mode has been set. When the determination is YES, then the flow moves to step 806. When the determination is NO, then the flow returns to step 800.

In step 806, it is determined whether or not acceleration information has been registered by the processing of step 802. When the determination is YES, then the flow moves to step 810. When the determination is NO, then the present correlating mode processing program ends.

In step 810, the LCD 38 is controlled such that the LCD 38 displays the type of information that is stored in the external memory 52 and is to be transmitted with respect to the other digital camera 10B. It will be noted that all digital image information that is stored in the external memory 52, a predetermined number of pieces of digital image information that is stored in the external memory 52, digital image information that is stored in the external memory 52 and has been obtained by performing continuous shooting, and audio information that is stored in the external memory 52 can be exemplified as the type of information that is to be transmitted with respect to the other digital camera 10B.

In the next step 812, the flow stands by until designation of the type of information that the LCD 38 is being caused to display by the processing of step 810 is received by the operation units 56.

In step 814, acceleration information that has been registered by the processing of step 802 and type information representing the type of information that has been designated by the processing of step 812 are registered by being correlated and stored in the memory 48. Thereafter, the present correlating mode processing program ends.

Figure 14:
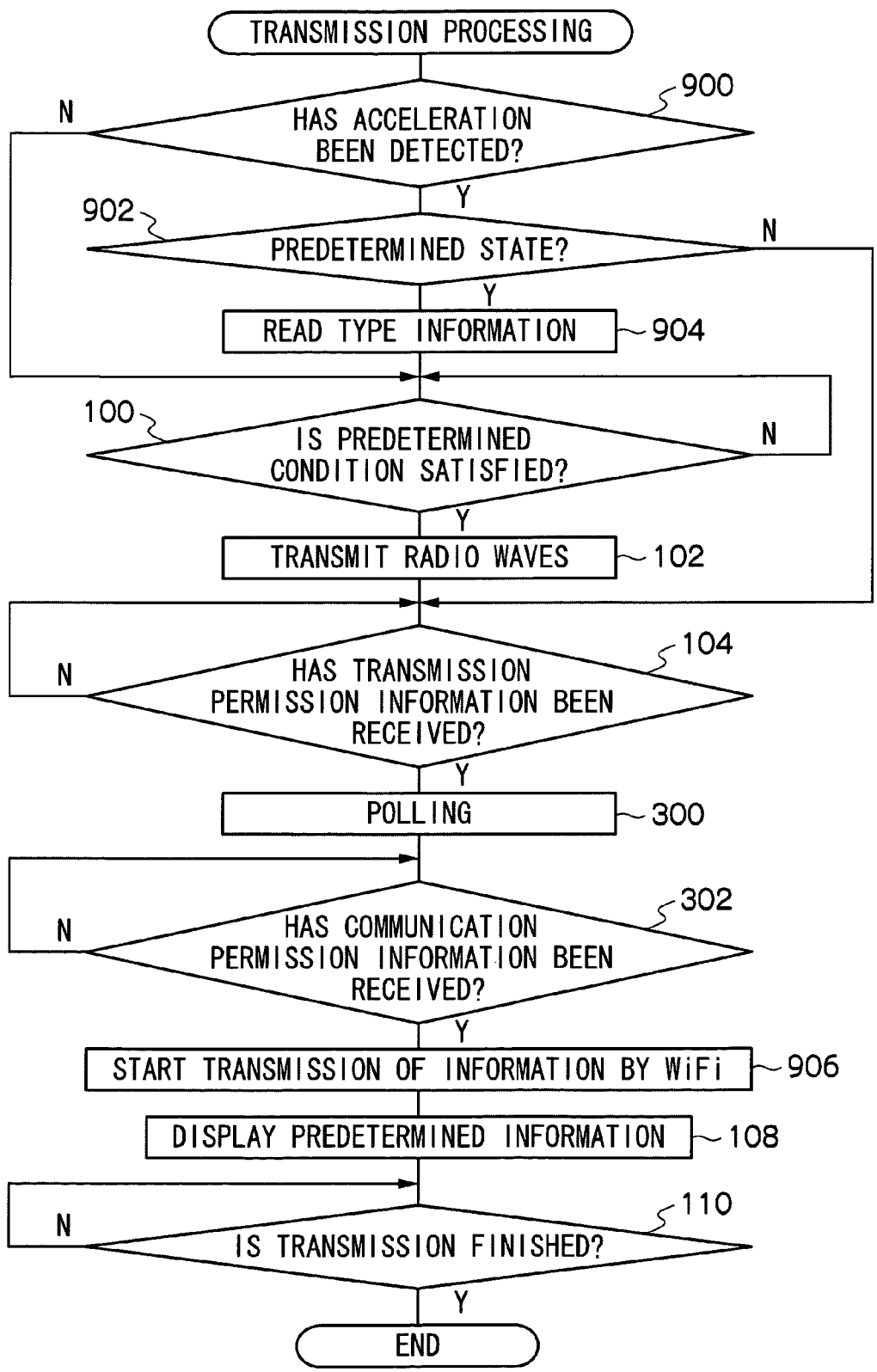
FIG. 14 is a flowchart showing a flow of processing by a transmission processing program pertaining to the fourth embodiment.

Next, action when one digital camera 10B of two of the digital cameras 10B transmits information to the other digital camera 10B will be described with reference to FIG. 14. It will be noted that FIG. 14 is a flowchart showing a flow of processing by a transmission processing program that is executed by the CPU 40 of the digital camera 10B at a predetermined timing. This program is stored in advance in a predetermined region of the memory 48. Further, step numbers that are the same as those in FIG. 8 will be given to steps in FIG. 14 that perform processing that is the same as the processing of the steps of the program shown in FIG. 8, and description of those same steps will be omitted.

In step 900 of the same diagram, it is determined whether or not acceleration equal to or greater than a predetermined value has been detected by the 3D acceleration sensor. When the determination is YES, then the flow moves to step 902. When the determination is NO, then the flow moves to step 100.

In step 902, it is determined whether or not the acceleration that has been detected by the processing of step 900 is a predetermined state. When the determination is YES, then the flow moves to step 904. When the determination is NO, then the flow moves to step 104. It will be noted that, in the digital camera 10B pertaining to the present embodiment, processing to determine whether or not acceleration information representing the state of the acceleration that has been detected by the processing of step 900 is stored in the memory 48 is applied as the processing of step 902.

In step 904, type information that has been correlated with acceleration information representing the state of the acceleration that has been detected by the processing of step 900 is read from the memory 48. Thereafter, the flow moves to step 100.

In step 906, the WiFi communication unit 72 is controlled such that, when the determination was YES by the processing of step 902, the WiFi communication unit 72 reads from the external memory 52 information of the type represented by the type information that has been read from the memory 48 by the processing of step 904 and starts transmission of the information and such that, when the determination was NO by the processing of step 902, the WiFi communication unit 72 starts transmission of the digital image information representing the image that is being displayed on the LCD 38 at this point in time.

As described in detail above, according to the present embodiment, the CPU 40 controls the digital camera 10B such that, when the acceleration that has been detected by the 3D acceleration sensor 66 is a predetermined state regardless of the magnitude of that acceleration, information that corresponds to the state is transmitted to the other digital camera 10B; thus, as a result of the digital camera 10B being placed in a predetermined moving state by a user, desired image information can be transmitted with respect to another digital camera 10B.

Further, according to the present embodiment, the operation units 56 receive, when registering the predetermined state, a designation of a type of information that is to be transmitted with respect to the other digital camera 10B in response to the state, the memory 48 correlates and stores, when registering the predetermined state, acceleration information that represents the state of the acceleration that has been detected by the 3D acceleration sensor 66 and type information that represents the type of information that has been received by the operation units 56, and the CPU 40 controls the digital camera 10B such that, when the acceleration information and the type information are correlated and stored in the memory 48 and acceleration is detected by the 3D acceleration sensor 66 and the acceleration information that represents the type of the acceleration is acceleration information that is stored in the memory 48, type information that corresponds to the acceleration information is read from the memory 48 and information of the type that is represented by the type information is transmitted with respect to the other digital camera 10B; thus, the moving state of the digital camera 10B and the type of information that is to be transmitted with respect to another digital camera 10B can be correlated and registered in advance and, as a result, changes in the type of information that is to be transmitted with respect to another digital camera 10B can be easily accommodated.

The present invention has been described using the preceding embodiments, but the technical scope of the present invention is not limited to the scope described in the preceding embodiments. Various alterations or improvements can be added to each of the preceding embodiments in a range that does not depart from the gist of the invention, and embodiments to which such alterations or improvements have been added are included in the technical scope of the present invention.

Further, the preceding embodiments are not intended to limit the inventions described in the claims, and it is not the case that all combinations of characteristics described in the preceding embodiments are essential to the solving means of the invention. Inventions of various stages are included in each of the preceding embodiments, and various inventions can be extracted by combinations that correspond to the situation of the plural configural elements that are disclosed. Even when some configural requirements are omitted from all of the configural requirements described in the embodiments, configurations from which those configural requirements have been omitted can be extracted as long as effects are obtained.

Figure 15:
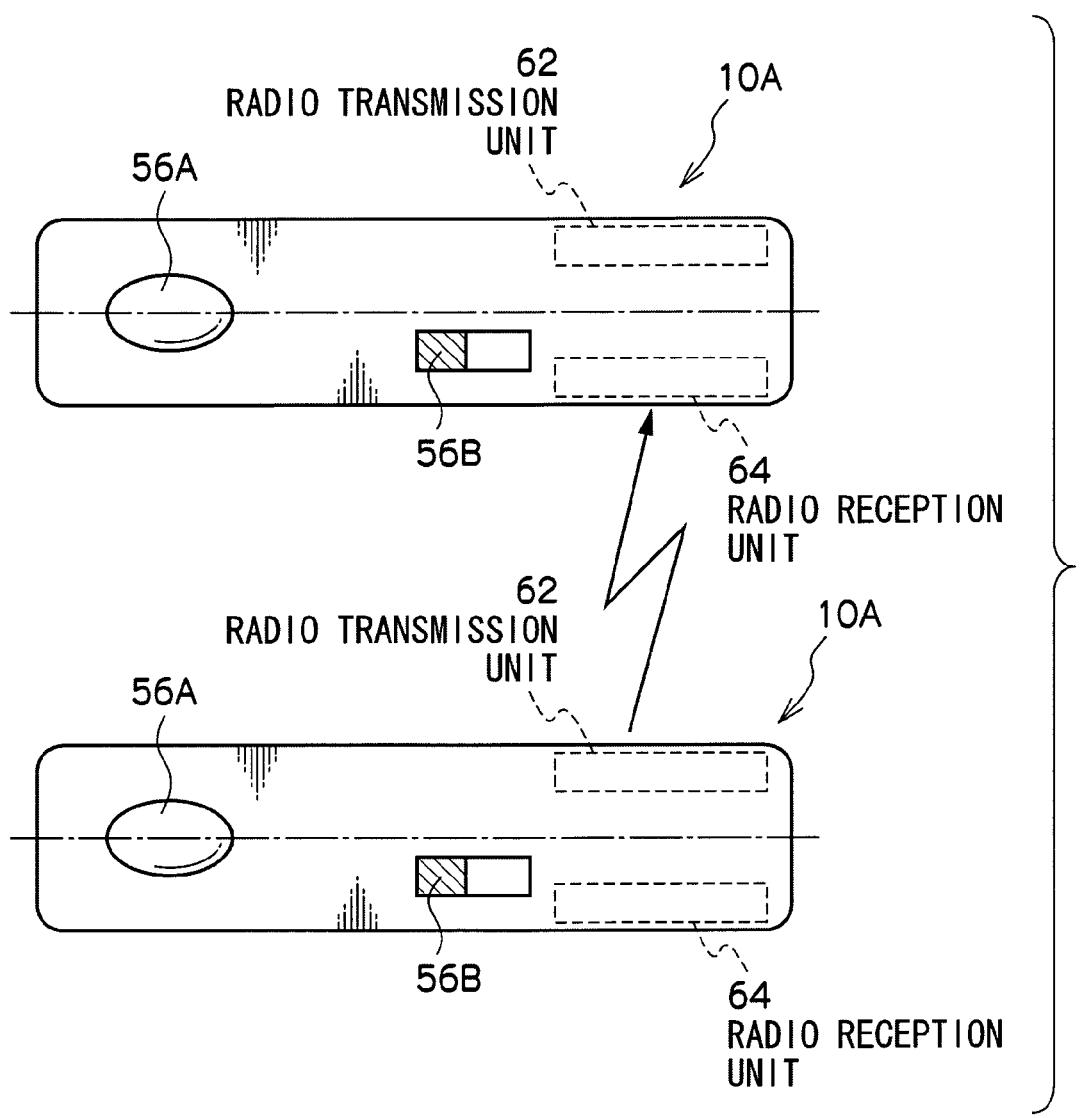
FIG. 15 is a general diagram showing another example of the disposition of the radio transmission unit and the radio reception unit in the digital camera pertaining to the first embodiment.
Figure 16:
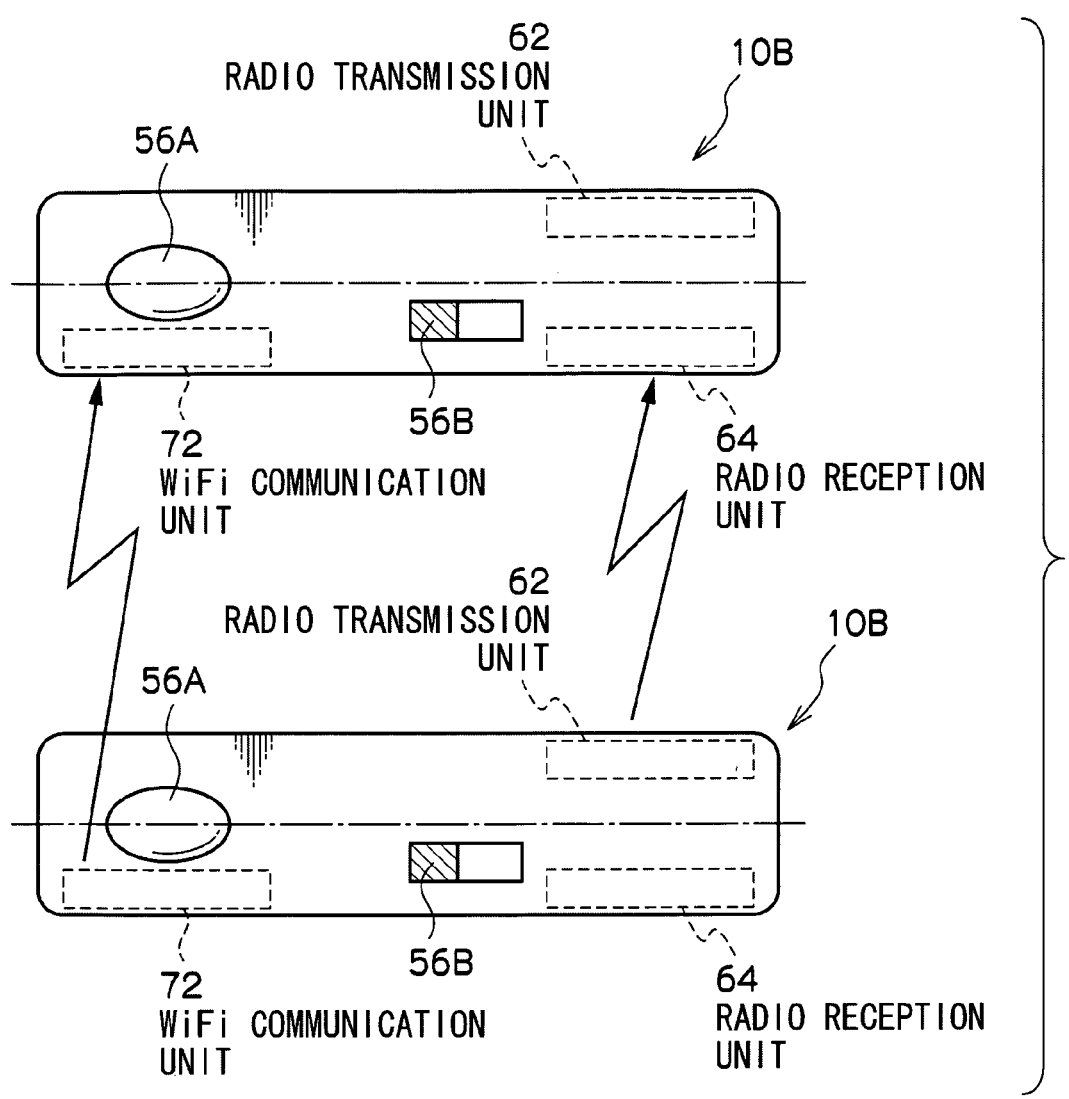
FIG. 16 is a general diagram showing another example of the disposition of the radio transmission unit and the radio reception unit in the digital camera pertaining to the second embodiment.

For example, in each of the preceding embodiments, a case has been described where the radio transmission unit 62 is disposed in the upper end portion of the digital camera 10A (10B) and the radio reception unit 64 is disposed in the bottom end portion of the digital camera 10A (10B) such that they are in line-symmetrical positions using as a boundary a horizontal plane (not shown) that passes through a centerline with respect to the vertical direction of the digital camera 10A (10B). However, as shown in FIG. 15 and FIG. 16, the radio transmission unit 62 may also be disposed in the rear side end portion of the digital camera 10A (10B) and the radio reception unit 64 may also be disposed in the front side end portion of the digital camera 10A (10B) such that they are in line-symmetrical positions using as a boundary a horizontal plane (indicated by the one-dotted chain line in the drawings) that divides the digital camera 10A (10B) into a front side and a rear side.

Figure 17:
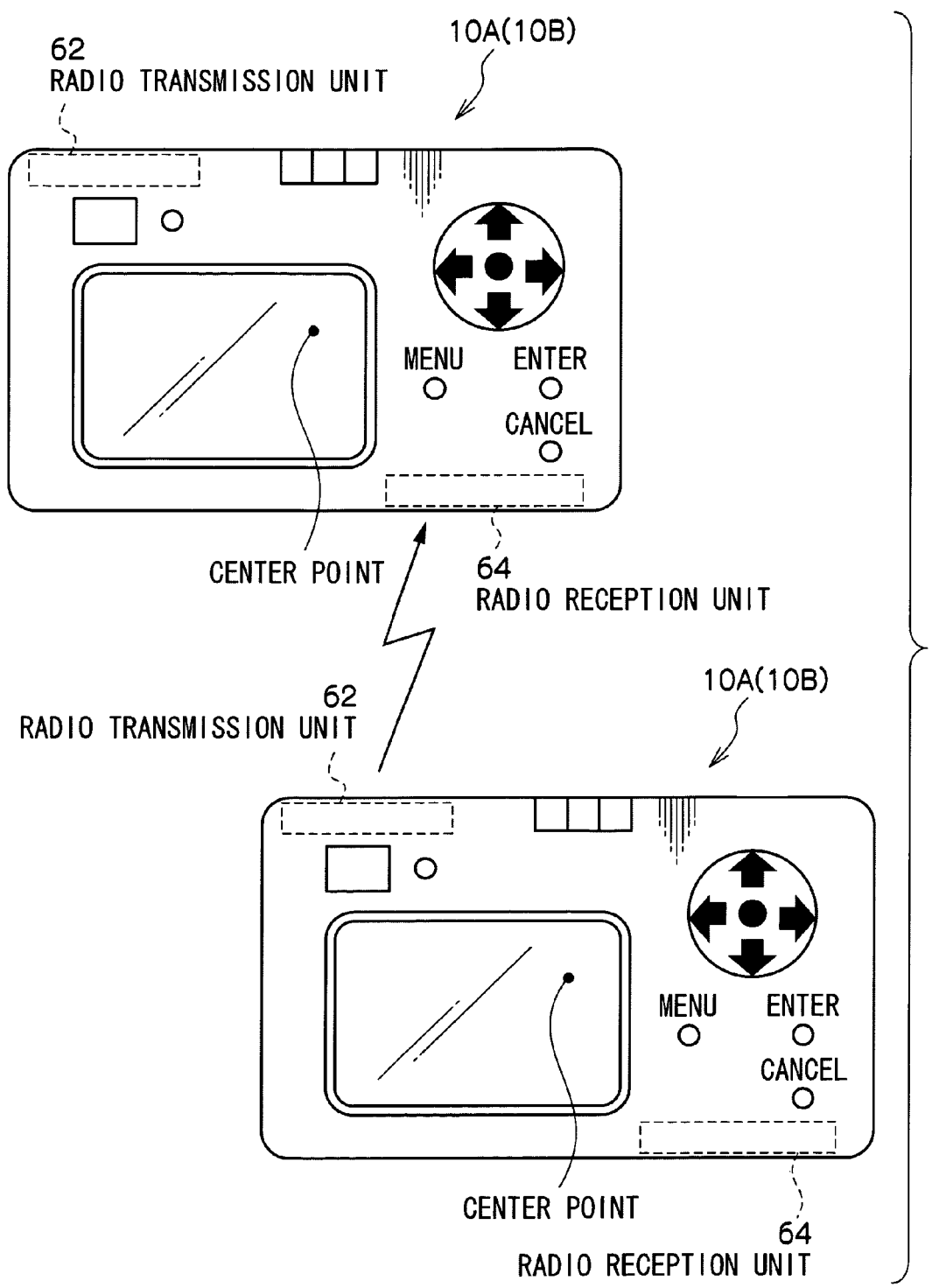
FIG. 17 is a general diagram showing another example of the disposition of the radio transmission unit and the radio reception unit in the digital cameras pertaining to the embodiments.

Further, as shown in FIG. 17, the radio transmission unit 62 may also be disposed in the upper end portion of the digital camera 10A (10B) and the radio reception unit 64 may also be disposed in the lower end portion of the digital camera 10A (10B) such that they are in point-symmetrical positions using as an axis a center point on the rear surface of the digital camera 10A (10B).

Figure 18:
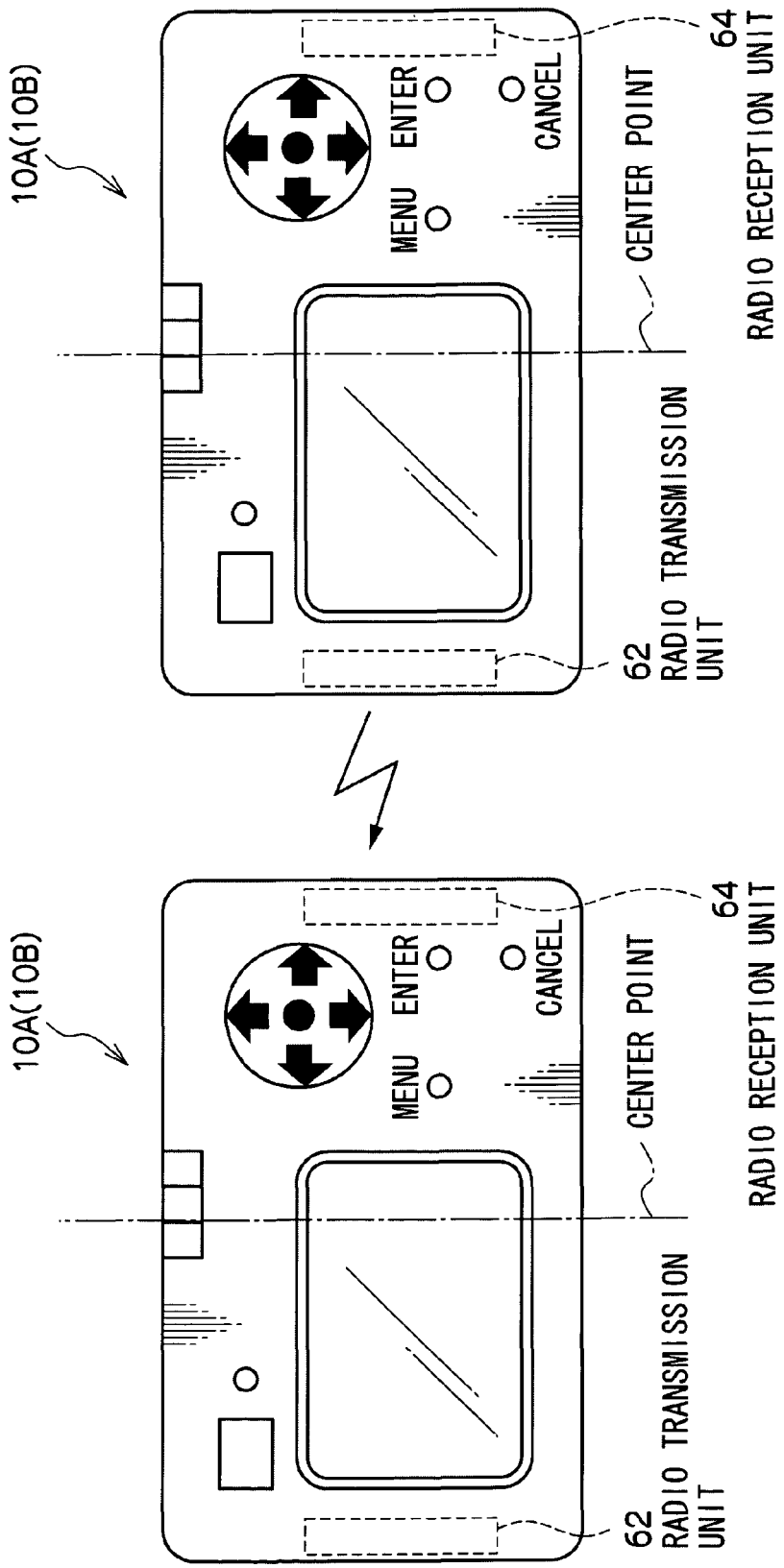
FIG. 18 is a general diagram showing another example of the disposition of the radio transmission unit and the radio reception unit in the digital cameras pertaining to the embodiments.

Further, as shown in FIG. 18, the radio transmission unit 62 may also be disposed in the left side end portion of the digital camera 10A (10B) when seen from the rear and the radio reception unit 64 may also be disposed in the right side end portion of the digital camera 10A (10B) when seen from the rear such that they are in line-symmetrical positions using as a boundary a vertical plane that passes through a centerline (indicated by the one-dotted chain line in the drawing) with respect to the left-right direction of the digital camera 10A (10B).

Further, in each of the preceding embodiments, a case has been described where the LCD 38 displays information indicating that the digital camera is transmitting information with respect to another digital camera and information indicating that the digital camera is receiving information from another digital camera, but the invention may also be configured such that this information is audibly indicated by a voice synthesis device such as a speaker. Further, the invention may also be configured such that this information is eternally visibly displayed by an image forming apparatus such as a printer. Moreover, the invention may also be configured to perform display that combines at least two of visible display by a display device, audible indication by a voice synthesis device and eternally visible display by an image forming apparatus. Embodiments where the digital camera displays information indicating that the digital camera is transmitting information with respect to another digital camera and information indicating that the digital camera is receiving information from another digital camera in this manner may be configured in any manner.

Further, the configurations of the digital cameras 10A and 10B (refer to FIG. 1, FIG. 2 and FIG. 6) that have been described in each of the preceding embodiments are only examples, and it goes without saying that the configurations are alterable in response to the situation within a range that does not depart from the gist of the invention.

Further, the flows of processing of each of the types of processing programs (see FIG. 4, FIG. 5, and FIG. 8 to FIG. 14) that have been described in each of the preceding embodiments are only examples, and it goes without saying that unnecessary steps can be omitted, new steps can be added, and the processing order can be changed within a range that does not depart from the gist of the present invention.

Further, in each of the preceding embodiments, a case has been described where the present invention was applied to a digital camera, but it goes without saying that the present invention can be applied to all communication devices, such as mobile telephones and personal computers.

As discussed above, an aspect of the present invention provides the communication system the first communication device further includes a third transmission unit that satisfies at least one condition of a condition where its communication speed is faster than that of the first transmission unit and a condition where its communicable distance is longer than that of the first transmission unit and which wirelessly transmits third information, and a third reception unit that receives fourth information that has been transmitted from fourth transmission unit which is included in the second communication device. The first control unit controls the first communication device such that, when communication becomes possible between the first reception unit and the second transmission unit, the third reception unit receives the fourth information, and such that, when communication becomes possible between the first transmission unit and the second reception unit, the third transmission unit transmits the third information. Thus, communication capability can be improved.

Another aspect of the present invention provides the communication system in which the first control unit controls the third communication device such that, when communication becomes impossible between the first reception unit and the second transmission unit while reception of the fourth information is being performed by the third reception unit, reception of the fourth information by the third reception unit is suspended and such that, when communication becomes impossible between the first transmission unit and the second reception unit while transmission of the third information is being performed by the third transmission unit, transmission of the third information by the third transmission unit is suspended. Thus, control of unnecessary communication can be stopped.

Another aspect of the present invention provides the communication system in which the first control unit controls the second communication device such that, when an operation mode other than an operation mode that performs communication with the second communication device is set, the communication with the second communication device is prohibited. Thus, when a mode that does not perform communication is set, a situation where unnecessary communication is performed can be prevented.

Another aspect of the present invention provides the communication system that further includes a first acceleration detection unit which, when the body of the communication device has moved, detects acceleration of the movement. The first control unit controls the first communication device such that, when the acceleration that has been detected by the first acceleration detection unit exceeds a predetermined threshold, communication with the second communication device is prohibited. Thus, a situation where unnecessary communication is performed can be prevented.

Another aspect of the present invention provides the communication system in which the first control unit controls such that, when the acceleration is a predetermined state, information that corresponds to the state is transmitted with respect to the second communication device. Thus, as a result of the communication device being placed in a predetermined moving state by a user, desired information can be transmitted with respect to another communication device.

Another aspect of the present invention provides the communication system further includes a first receiving unit which receives a designation of a type of information that is to be transmitted with respect to the second communication device in response to the state, and a first storage unit which correlates and stores the state of the detected acceleration and the type of the information that has been received by the first receiving unit. The first control unit controls the first communication device such that, when the state of the acceleration and the type of the information are correlated and stored in the first storage unit and acceleration is detected by the first acceleration detection unit and the state of the acceleration corresponds to a state of acceleration that is stored in the first storage unit, the type of the information that corresponds to the state of the acceleration is read from the first storage unit and the type of the information is transmitted with respect to the second communication device.

The moving state of the communication device and the type of information that is to be transmitted with respect to another communication device can be correlated and registered in advance and, as a result, changes in the type of information that is to be transmitted with respect to another communication device can be easily accommodated.

Another aspect of the present invention the communication system further includes a first display unit that displays an image represented by image information. The first control unit controls the first communication device such that the image information representing the image that is being displayed by the first display unit is to be transmitted with respect to the second communication device. Thus, desired images can be easily provided to another communication device.

Another aspect of the present invention the communication system in which the first control unit controls the first communication device such that the first display device displays information indicating that the first communication device is transmitting the first and the third information with the second communication device and such that, when the first communication device is receiving the second and the fourth information from the second communication device, the first display device displays information indicating that the communication device is receiving the information. Thus, a user can easily understand whether the communication device is transmitting or receiving information.

It will be noted that, in addition to visible display by an image display device such as a display, eternally visible display by an image forming apparatus such as a printer and audible indication by a voice synthesis device are included in the display by the control unit.

What is claimed is:

1. A communication system comprising a first communication device and a second communication device, the first and the second communication devices being disposed in a predetermined distance range and positional relationship and performing communication between each of them, the first and the second communication devices comprising:
a first transmission unit and a second transmission unit that are disposed respectively on bodies of the first and the second communication devices and wirelessly transmit predetermined information to each other, and the first communication device further comprising:
a first reception unit that is disposed in a position where the first reception unit is capable of communicating with the second transmission unit and receives second information that has been transmitted from the second transmission unit; and
a first control unit that controls the first communication device such that, when communication becomes possible between the first reception unit and the second transmission unit, the first reception unit receives the second information, and such that, when communication becomes possible between the first transmission unit and the second reception unit, the first transmission unit transmits first information, wherein the first communication device and the second communication device are independently movable, wherein communication becomes possible between the first reception unit and the second transmission unit when the second communication device receives a transmission permission signal that is sent by the first communication device in response to a transmission request signal that is sent by the second communication device, and wherein communication becomes possible between the first transmission unit and the second reception unit when the first communication device receives a transmission permission signal that is sent by the second communication device in response to a transmission request signal that is sent by the first communication device, a first acceleration detection unit which detects acceleration of a movement, wherein when the acceleration comprises a predetermined state, information that corresponds to the predetermined state is transmitted, when registering the predetermined state,
a first receiving unit which receives a designation of a type of information that is to be transmitted
a first storage unit which correlates and stores the predetermined state of the detected acceleration and the type of the information wherein the first control unit controls the first communication device such that, when the predetermined state of the acceleration and the type of the information are correlated and stored in the first storage unit and acceleration is detected by the first acceleration detection unit and the predetermined state of the acceleration corresponds to a state of acceleration that is stored in the first storage unit, the type of the information that corresponds to the state of the acceleration is read from the first storage unit and the type of the information is transmitted with respect to the second communication device.

2. The communication system of claim 1, wherein the first communication device further comprises:
a third transmission unit that satisfies at least one condition of a condition where its communication speed is faster than that of the first transmission unit and a condition where its communicable distance is longer than that of the first transmission unit and which wirelessly transmits third information; and
a third reception unit that receives fourth information that has been transmitted from fourth transmission unit which is included in the second communication device, and wherein the first control unit controls the first communication device such that, when communication becomes possible between the first reception unit and the second transmission unit, the third reception unit receives the fourth information, and such that, when communication becomes possible between the first transmission unit and the second reception unit, the third transmission unit transmits the third information.

3. The communication system of claim 2, wherein the first control unit controls the third communication device such that, when communication becomes impossible between the first reception unit and the second transmission unit while reception of the fourth information is being performed by the third reception unit, reception of the fourth information by the third reception unit is suspended and such that, when communication becomes impossible between the first transmission unit and the second reception unit while transmission of the third information is being performed by the third transmission unit, transmission of the third information by the third transmission unit is suspended.

4. The communication system of claim 1, wherein the first control unit controls the second communication device such that, when an operation mode other than an operation mode that performs communication with the second communication device is set, the communication with the second communication device is prohibited.

5. The communication system of claim 1, further comprising the first acceleration detection unit which, when a body of the communication device has moved, detects acceleration of the movement,
wherein the first control unit controls the first communication device such that, when the acceleration that has been detected by the first acceleration detection unit exceeds a predetermined threshold, communication with the second communication device is prohibited.

6. The communication system of claim 5, wherein the first control unit controls such that, when the acceleration comprises the predetermined state, information that corresponds to the predetermined state is transmitted with respect to the second communication device.

7. The communication system of claim 6, further comprising:
when registering the predetermined state,
the first receiving unit which receives the designation of the type of information that is to be transmitted with respect to the second communication device in response to the state; and
the first storage unit which correlates and stores the predetermined state of the detected acceleration and the type of the information that has been received by the first receiving unit.

8. The communication system of claim 1, further comprising a first display unit that displays an image represented by image information,
wherein the first control unit controls the first communication device such that the image information representing the image that is being displayed by the first display unit is to be transmitted with respect to the second communication device.

9. The communication system of claim 1, wherein the first control unit controls the first communication device such that the first display device displays information indicating that the first communication device is transmitting the first and the third information with the second communication device and such that, when the first communication device is receiving the second and the fourth information from the second communication device, the first display device displays information indicating that the communication device is receiving the information.

10. The communication system of claim 1, further comprising:
a first communication unit for transmitting the transmission permission signal that is sent by the first communication device; and
a second communication unit for transmitting the transmission permission signal that is sent by the second communication device.

11. The communication system of claim 10, wherein said first and second communication units are different from said first and second transmission units.

12. The communication system of claim 10, wherein said first and second communication units have a faster communication speed than a communication speed of each of said first and second transmission units, and
wherein said first and second communication units have a longer communicable distance than a communicable distance of each of said first and second transmission units.

13. The communication system of claim 1, wherein the first communication device is incorporated in a first image shooting unit and the second communication device is incorporated in a second image shooting unit.

14. A communication method of a communication system comprising a first communication device and a second communication device the first and the second communication devices being disposed in a predetermined distance range and positional relationship, and performing communication between each of them,
the first and the second communication devices comprising—
a first transmission unit and a second transmission unit that are disposed respectively on bodies of the first and the second communication devices and wirelessly transmit predetermined information to each other,
the first communication device further comprising:
a first reception unit of the first communication device that is disposed in a position where the first reception unit is capable of communicating with the second transmission unit and receives second information that has been transmitted from the second transmission unit, and
the communication method comprising:
controlling the first communication device such that, when communication becomes possible between the first reception unit and the second transmission unit, the first reception unit receives the second information; and
controlling the first communication device such that when communication becomes possible between the first transmission unit and the second reception unit, the first transmission unit transmits first information~
wherein the first communication device and the second communication device are independently movable,
wherein communication becomes possible between the first reception unit and the second transmission unit when the second communication device receives a transmission permission signal that is sent by the first communication device in response to a transmission request signal that is sent by the second communication device, and
wherein communication becomes possible between the first transmission unit and the second reception unit when the first communication device receives a transmission permission signal that is sent by the second communication device in response to a transmission request signal that is sent by the first communication device,
a first acceleration detection unit which detects acceleration of a movement,
wherein when the acceleration comprises a predetermined state, information that corresponds to the predetermined state is transmitted,
when registering the predetermined state,
a first receiving unit which receives a designation of a type of information that is to be transmitted
a first storage unit which correlates and stores the predetermined state of the detected acceleration and the type of the information
wherein the first control unit controls the first communication device such that, when the predetermined state of the acceleration and the type of the information are correlated and stored in the first storage unit and acceleration is detected by the first acceleration detection unit and the predetermined state of the acceleration corresponds to a state of acceleration that is stored in the first storage unit, the type of the information that corresponds to the state of the acceleration is read from the first storage unit and the type of the information is transmitted with respect to the second communication device.

15. A computer-readable medium in which is stored a communication program that is executed by a communication system comprising a first communication device and a second communication device the first and the second communication devices being disposed in a predetermined distance range and positional relationship, and performing communication between each of them,
the first and the second communication devices comprising:
a first transmission unit and a second transmission unit that are disposed respectively on bodies of the first and the second communication devices and wirelessly transmits transmit predetermined information to each other, the first communication device further comprising:

a first reception unit of the first communication device that is disposed in a position where the first reception unit is capable of communicating with the second transmission unit and receives second information that has been transmitted from the second transmission unit, and the computer-readable medium causing a computer to execute:

controlling the first communication device such that, when communication becomes possible between the first reception unit and the second transmission unit, the first reception unit receives the second information; and controlling the first communication device such that when communication becomes possible between the first transmission unit and the second reception unit, the first transmission unit transmits first information, wherein the first communication device and the second communication device are independently movable, wherein communication becomes possible between the first reception unit and the second transmission unit when the second communication device receives a transmission permission signal that is sent by the first communication device in response to a transmission request signal that is sent by the second communication device, and wherein communication becomes possible between the first transmission unit and the second reception unit when the first communication device receives a transmission permission signal that is sent by the second communication device in response to a transmission request signal that is sent by the first communication device, a first acceleration detection unit which detects acceleration of a movement, wherein when the acceleration comprises a predetermined state, information that corresponds to the predetermined state is transmitted, when registering the predetermined state, a first receiving unit which receives a designation of a type of information that is to be transmitted a first storage unit which correlates and stores the predetermined state of the detected acceleration and the type of the information wherein the first control unit controls the first communication device such that, when the predetermined state of the acceleration and the type of the information are correlated and stored in the first storage unit and acceleration is detected by the first acceleration detection unit and the predetermined state of the acceleration corresponds to a state of acceleration that is stored in the first storage unit, the type of the information that corresponds to the state of the acceleration is read from the first storage unit and the type of the information is transmitted with respect to the second communication device.

16. An image shooting device comprising the communication device of claim 1 and an image shooting unit that shoots a subject to acquire, as information to be transmitted by the communication device, image information representing the subject.

\* \* \* \* \*